US009687766B2

(12) United States Patent
Crabtree et al.

(10) Patent No.: US 9,687,766 B2
(45) Date of Patent: *Jun. 27, 2017

(54) COLLAPSIBLE AND/OR ASSEMBLED FILTER HOUSING AND FILTER USED THEREWITH

(71) Applicants: LaMonte A. Crabtree, Louisville, KY (US); Richard Keith Chesson, Jr., Louisville, KY (US); Ronald Jay Geil, Jr., LaGrange, KY (US); Jeffrey A. Sinclair, Clarksville, IN (US)

(72) Inventors: LaMonte A. Crabtree, Louisville, KY (US); Richard Keith Chesson, Jr., Louisville, KY (US); Ronald Jay Geil, Jr., LaGrange, KY (US); Jeffrey A. Sinclair, Clarksville, IN (US)

(73) Assignee: Clarcor Air Filtration Products, Inc., Jeffersonville, IN (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/733,679

(22) Filed: Jun. 8, 2015

(65) Prior Publication Data

US 2015/0265959 A1 Sep. 24, 2015

Related U.S. Application Data

(63) Continuation-in-part of application No. 13/479,765, filed on May 24, 2012, now Pat. No. 9,185,877, and
(Continued)

(51) Int. Cl.
*B01D 46/00* (2006.01)
*A01K 1/00* (2006.01)
(Continued)

(52) U.S. Cl.
CPC ........ *B01D 46/0023* (2013.01); *A01K 1/0047* (2013.01); *A01K 1/0058* (2013.01);
(Continued)

(58) Field of Classification Search
CPC .. B01D 46/00; B01D 46/0005; B01D 46/001; B01D 46/0023; B01D 46/10;
(Continued)

(56) References Cited

U.S. PATENT DOCUMENTS 3,490,211 A 1/1970 Cartier
3,624,161 A 11/1971 Bub
(Continued)

FOREIGN PATENT DOCUMENTS

CA 2036639 A1 9/1991
CN 101818689 A 9/2010
(Continued)

OTHER PUBLICATIONS

U.S. Appl. No. 61/490,896, filed May 27, 2011, Crabtree et al.
(Continued)

*Primary Examiner* — Jacob T Minskey
*Assistant Examiner* — Minh-Chau Pham
(74) *Attorney, Agent, or Firm* — Reinhart Boerner Van Deuren P.C.

(57) ABSTRACT

A filter assembly including a rectangular inlet frame having a rectangular inlet opening, a rectangular outlet frame, a housing body being collapsible to have a flattened shipping state and an erect state, the collapsible housing body in the erect state being rectangular and interposed between the rectangular inlet frame and the rectangular outlet frame in an assembled state, and at least one filter having filter media installed in the rectangular inlet opening in generally sealing
(Continued)

relation thereto and projecting from the inlet frame toward the outlet frame in the assembled state.

26 Claims, 35 Drawing Sheets

Related U.S. Application Data a continuation-in-part of application No. 13/479,791, filed on May 24, 2012, now Pat. No. 9,049,838, application No. 14/733,679, filed on Jun. 8, 2015, which is a continuation-in-part of application No. 13/479,841, filed on May 24, 2012, now Pat. No. 9,510,557, application No. 14/733,679, filed on Jun. 8, 2015, which is a continuation-in-part of application No. 13/479,880, filed on May 24, 2012, now Pat. No. 9,049,839.

(60) Provisional application No. 61/491,136, filed on May 27, 2011, provisional application No. 61/495,230, filed on Jun. 9, 2011, provisional application No. 61/591,157, filed on Jan. 26, 2012.

(51) Int. Cl.
  B01D 46/10 (2006.01)
  B01D 46/12 (2006.01)
  B01D 46/52 (2006.01)
  F24F 3/16 (2006.01)

(52) U.S. Cl.
  CPC ........ A01K 1/0064 (2013.01); B01D 46/0005 (2013.01); B01D 46/0016 (2013.01); B01D 46/10 (2013.01); B01D 46/125 (2013.01); B01D 46/52 (2013.01); F24F 3/1603 (2013.01); B01D 46/002 (2013.01); B01D 2265/028 (2013.01); B01D 2271/02 (2013.01); Y10T 29/49826 (2015.01)

(58) Field of Classification Search
  CPC ...... B01D 46/125; B01D 46/521; A01K 1/00; A01K 1/0064; A01K 1/0047; A01K 1/0058
  USPC ......... 55/482, 495, 499, 500, 501, 502, 521, 55/DIG. 31, 385.2, 484, 490, 493; 454/187; 210/339, 495; 119/419, 444, 119/447
  See application file for complete search history.

(56) References Cited

U.S. PATENT DOCUMENTS

| | | | |
|---|---|---|---|
| 3,744,216 A | 7/1973 | Halloran |
| 3,793,813 A | 2/1974 | McAllister |
| 3,844,204 A | 10/1974 | Ball |
| 3,925,043 A | 12/1975 | Matrone et al. |
| 3,999,964 A | 12/1976 | Carr |
| 4,225,328 A | 9/1980 | Stiehl |
| 4,810,269 A | 3/1989 | Stackhouse et al. |
| 4,865,637 A | 9/1989 | Gruber |
| 5,145,500 A | 9/1992 | Nolen, Jr. |
| 5,288,298 A | 2/1994 | Aston |
| 5,290,345 A | 3/1994 | Osendorf et al. |
| 5,290,447 A | 3/1994 | Lippold |
| 5,322,213 A | 6/1994 | Carter et al. |
| 5,351,846 A | 10/1994 | Carter |
| 5,476,526 A | 12/1995 | Attermeyer |
| 5,496,389 A | 3/1996 | Wilcox |
| 5,501,794 A | 3/1996 | Van de Graaf et al. |
| 5,512,074 A | 4/1996 | Hanni et al. |
| 5,512,172 A | 4/1996 | Marble |
| 5,531,892 A | 7/1996 | Duffy |
| 5,593,470 A | 1/1997 | Shagott et al. |
| 5,622,543 A | 4/1997 | Yang |
| 5,690,719 A | 11/1997 | Hodge |
| 5,792,229 A | 8/1998 | Sassa et al. |
| 5,804,014 A | 9/1998 | Kähler |
| 5,810,898 A | 9/1998 | Miller |
| 5,820,646 A | 10/1998 | Gillingham et al. |
| 5,827,340 A | 10/1998 | Fiske |
| 5,853,445 A | 12/1998 | Wong et al. |
| 5,908,598 A | 6/1999 | Rousseau et al. |
| 5,944,860 A | 8/1999 | Mack et al. |
| 5,944,869 A | 8/1999 | Modica et al. |
| 6,099,612 A | 8/2000 | Bartos |
| 6,152,996 A | 11/2000 | Linnersten et al. |
| 6,156,089 A | 12/2000 | Stemmer et al. |
| 6,174,342 B1 | 1/2001 | Jeanseau |
| 6,179,891 B1 | 1/2001 | Knudsen et al. |
| 6,203,592 B1 | 3/2001 | Carawan |
| 6,214,076 B1 | 4/2001 | Beier et al. |
| 6,293,983 B1 | 9/2001 | More |
| 6,312,489 B1 | 11/2001 | Ernst et al. |
| 6,315,805 B1 | 11/2001 | Strauss |
| 6,319,307 B1 | 11/2001 | Shanks et al. |
| 6,321,637 B1 | 11/2001 | Shanks et al. |
| 6,348,085 B1 | 2/2002 | Tokar et al. |
| 6,361,577 B1 | 3/2002 | Unrath et al. |
| 6,406,657 B1 | 6/2002 | Eitzman et al. |
| 6,419,871 B1 | 7/2002 | Ogale |
| 6,447,566 B1 | 9/2002 | Rivera et al. |
| 6,685,833 B2 | 2/2004 | Lippold |
| 6,824,581 B1 | 11/2004 | Tate et al. |
| 7,959,700 B2 | 6/2011 | Kidman |
| 8,105,409 B2 | 1/2012 | Mann et al. |
| 9,049,838 B2 | 6/2015 | Crabtree et al. |
| 9,049,839 B2 | 6/2015 | Crabtree |
| 9,126,135 B2 | 9/2015 | Crabtree et al. |
| 9,185,877 B2 | 11/2015 | Crabtree et al. |
| 2004/0182055 A1 | 9/2004 | Wynn |
| 2005/0022489 A1 | 2/2005 | Harden et al. |
| 2005/0150812 A1 | 7/2005 | Carter |
| 2006/0021302 A1 | 2/2006 | Bernard |
| 2007/0204576 A1 | 9/2007 | Terlson et al. |
| 2008/0017038 A1 | 1/2008 | Wu |
| 2008/0022643 A1 | 1/2008 | Fox et al. |
| 2008/0022645 A1 | 1/2008 | Skirius et al. |
| 2008/0034718 A1 | 2/2008 | Schuld et al. |
| 2008/0282652 A1 | 11/2008 | Wardlaw |
| 2009/0199717 A1 | 8/2009 | Green et al. |
| 2009/0301402 A1* | 12/2009 | Devine .................. A01K 1/00 119/447 |
| 2010/0095846 A1 | 4/2010 | Skirius et al. |
| 2010/0192528 A1 | 8/2010 | Mann et al. |
| 2010/0251678 A1 | 10/2010 | Mann et al. |
| 2010/0313757 A1 | 12/2010 | Crabtree et al. |
| 2010/0313760 A1 | 12/2010 | Crabtree et al. |
| 2011/0308210 A1 | 12/2011 | Crabtree et al. |
| 2012/0227366 A1 | 9/2012 | Aycock |
| 2012/0291406 A1 | 11/2012 | Crabtree |
| 2012/0317940 A1 | 12/2012 | Ball et al. |
| 2012/0317941 A1 | 12/2012 | Crabtree et al. |
| 2012/0318144 A1 | 12/2012 | Crabtree |
| 2013/0091818 A1 | 4/2013 | Anoszko et al. |
| 2013/0205732 A1 | 8/2013 | Gillilan |
| 2013/0318936 A1 | 12/2013 | Ball et al. |

FOREIGN PATENT DOCUMENTS

| | | |
|---|---|---|
| DE | 19755466 A1 | 6/1999 |
| EP | 1 428 566 A1 | 6/2004 |
| GB | 2 252 922 A | 8/1992 |
| JP | 3146110 A | 6/1991 |
| JP | 6269624 A | 9/1994 |
| JP | 7323217 A | 12/1995 |
| JP | 10-019367 A | 1/1998 |

(56) References Cited

FOREIGN PATENT DOCUMENTS

JP       2008-031967 A     2/2008
KR     20-0445119 Y1     6/2009

OTHER PUBLICATIONS

Jiang Xiangyun et al.; Design Materials and Processing Technology, Beijing Higher Education Excellent Texts; 2010/2011; 8 pages.

* cited by examiner

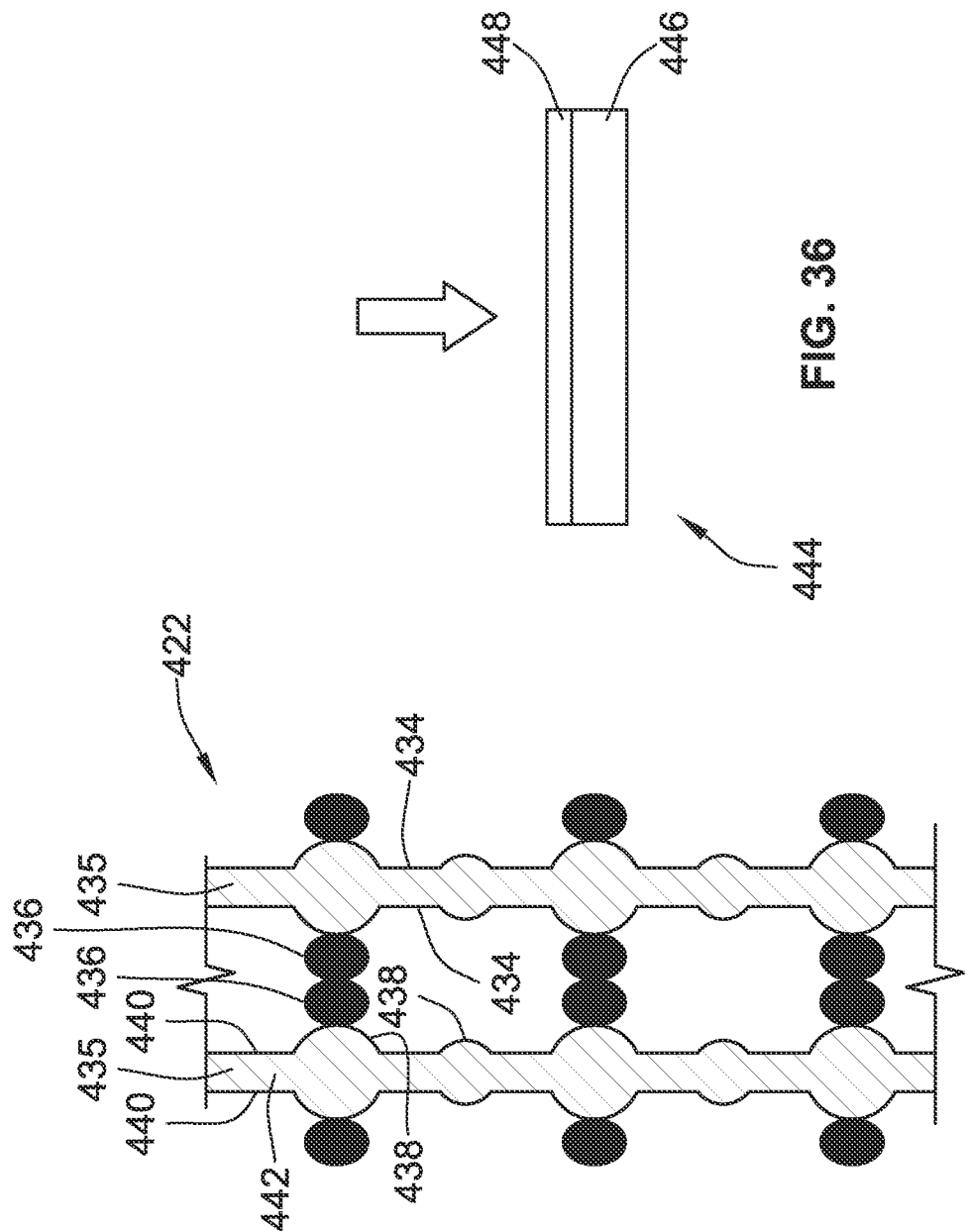

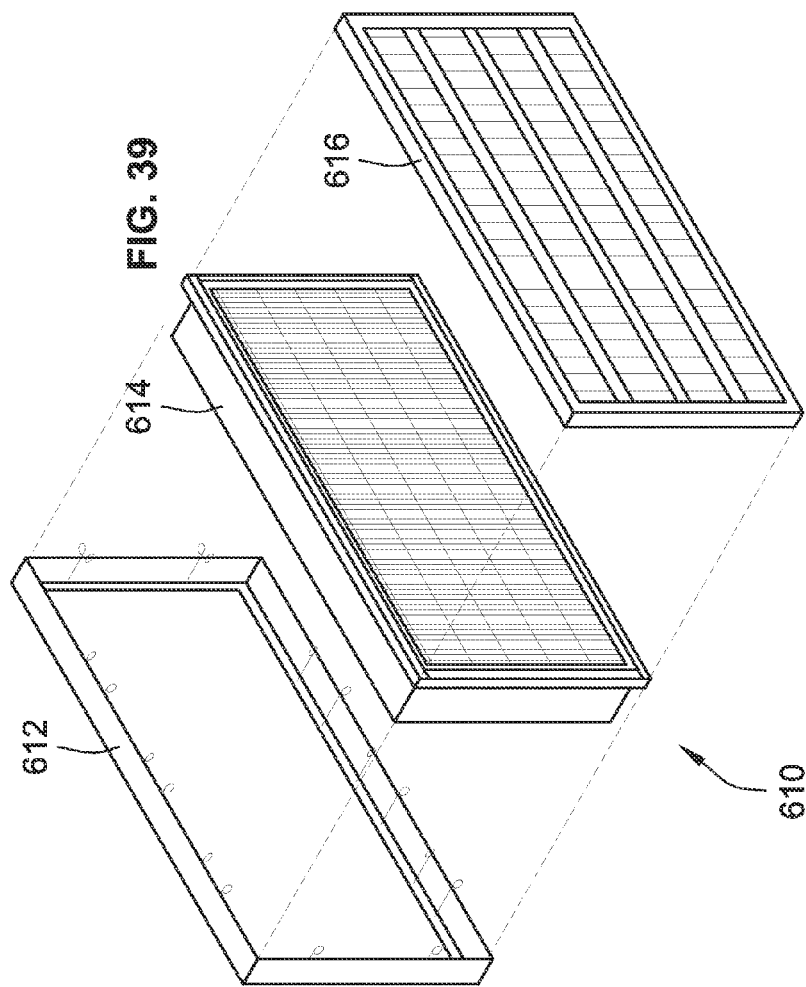
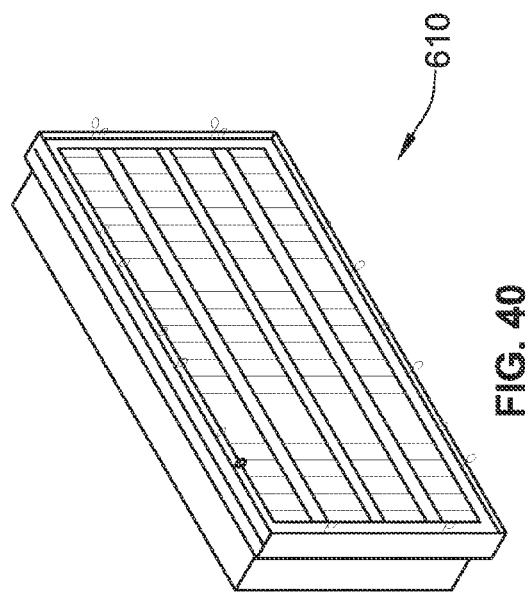

COLLAPSIBLE AND/OR ASSEMBLED FILTER HOUSING AND FILTER USED THEREWITH

CROSS-REFERENCE TO RELATED PATENT APPLICATIONS

This patent application is a continuation-in-part of U.S. patent application Ser. No. 13/479,765, filed May 24, 2012, which is now U.S. Pat. No. 9,185,877, which claims the benefit of U.S. Provisional Patent Application No. 61/491,136, filed May 27, 2011; and U.S. Provisional Patent No. 61/495,230, filed Jun. 9, 2011; and U.S. Provisional Patent Application No. 61/591,157, filed Jan. 26, 2012, which are now inactive, the entire teachings and disclosure of which are incorporated herein by reference thereto.

This patent application is a continuation-in-part of co-pending U.S. patent application Ser. No. 13/479,791, filed May 24, 2012, which is now U.S. Pat. No. 9,049,838, which claims the benefit of U.S. Provisional Patent Application No. 61/491,136, filed May 27, 2011; and U.S. Provisional Patent No. 61/495,230, filed Jun. 9, 2011; and U.S. Provisional Patent Application No. 61/591,157, filed Jan. 26, 2012, which are now inactive, the entire teachings and disclosure of which are incorporated herein by reference thereto.

This patent application is continuation-in-part of co-pending U.S. patent application Ser. No. 13/479,841, filed May 24, 2012, which claims the benefit of U.S. Provisional Patent Application No. 61/491,136, filed May 27, 2011; and U.S. Provisional Patent No. 61/495,230, filed Jun. 9, 2011; and U.S. Provisional Patent Application No. 61/591,157, filed Jan. 26, 2012, which are now inactive, the entire teachings and disclosure of which are incorporated herein by reference thereto.

This patent application is a continuation-in-part of co-pending U.S. patent application Ser. No. 13/479,880, filed May 24, 2012, which is now U.S. Pat. No. 9,049,839, which claims the benefit of U.S. Provisional Patent Application No. 61/491,136, filed May 27, 2011; and U.S. Provisional Patent No. 61/495,230, filed Jun. 9, 2011; and U.S. Provisional Patent Application No. 61/591,157, filed Jan. 26, 2012, which are now inactive, the entire teachings and disclosure of which are incorporated herein by reference thereto.

FIELD OF THE INVENTION

This invention generally relates to air filtrations systems, and more particularly, to filtration systems used in animal confinement facilities or in other filtration applications and/or to an alternative to V-Bank Filters.

BACKGROUND OF THE INVENTION

One of the concerns in agricultural animal confinement facilities, particularly in the agricultural swine industry, is the control of the spread of disease. For example, disease agents such as mycoplasma, the swine influenza virus, and the porcine reproductive and respiratory syndrome virus (PRRSV) have had a significant negative impact on swine production. It has been estimated that PRRSV alone may increase the average cost of swine production by $5.60 to $7.62 per head.

One method that has proven effective is reducing the spread of the aforementioned disease agents is filtration of the air in animal confinement facilities. For example, high-efficiency air filters have proven to be effective at reducing the rate of airborne transmission of these disease agents. One of the challenges for the swine production industry is how to best provide the needed high-efficiency air filtration in a practical manner at the lowest cost, with ease of filter change out, and with reliability for the environmental application.

Facilities, such as those used for animal confinement, may have dozens, if not more, separate filtration units installed throughout the facility. Assembly, installation and maintenance of these filtration units is generally expensive and time-consuming. Various examples in the art are disclosed in Crabtree et al., US 2010/0313760 and Devine et al., US 2009/0301402, the entire disclosures of which are hereby incorporated by reference in their entireties. A test standard for sufficiently filtering out PRRSV is advanced in the '402 publication to Devine et al. as well as air flow requirements desired for animal confinement buildings.

Heretofore, commercially employed virus filters for animal confinement buildings (e.g. for removal of PRRSV) such as in the above examples have employed V-Bank Filters with a MERV 16 type media that is either wet laid microglass and/or synthetic polymeric fibers. V-bank filters in these applications have been used and are highly desirable due to the high flow rates experienced (e.g. typically a filter (2' high×2' wide) needs to handle at least 1000 CFM as substantial air flow for hog confinement to facilitate ventilation for proper humidity, temperature and air quality (e.g. ammonia, and other airborne contaminants and byproducts of hog confinement and manure pits). The substantial header depth (e.g. filter elements are typically about 12 inches deep in the direction of air flow; also referred to as header depth) and open V shaped cavities between different filter media packs of V-Bank filters provide the capability for handling the substantial flow volume and requirements, while at the same time filtering the PRRS virus. Further, it is known to add a prefilter due to the external environment that is often laden with dust. For example pre-filters are known in combination with V-banks such as Rivera et al. U.S. Pat. No. 6,447,566, the entire disclosure of which is hereby incorporated by reference.

BRIEF SUMMARY OF THE INVENTION

In one aspect, embodiments of the invention provide a filter assembly including a rectangular inlet frame having a rectangular inlet opening, a rectangular outlet frame, a housing body being collapsible to have a flattened shipping state and an erect state, the collapsible housing body in the erect state being rectangular and interposed between the rectangular inlet frame and the rectangular outlet frame in an assembled state, and at least one filter having filter media installed in the rectangular inlet opening in generally sealing relation thereto and projecting from the inlet frame toward the outlet frame in the assembled state.

In another aspect, embodiments of the invention provide a filter assembly that includes an inlet frame having an inlet opening, an outlet frame, a housing body extending between the inlet frame and the outlet frame, first and second housing gaskets, the first housing gasket sealing between the outlet frame and the housing body, the second housing gasket sealing between the inlet frame and the housing body, and at least one filter having filter media installed in the inlet opening in generally sealing relation thereto and projecting from the inlet frame toward the outlet frame in the assembled state.

In another aspect, embodiments of the invention provide a filter assembly that includes a filter housing assembly with an inlet frame having a rectangular inlet opening, wherein the rectangular inlet frame defines a rectangular recess having a seating surface in surrounding relation of the rectangular opening, and a V-bank filter (or other alternative primary filter as disclosed herein) having an outer peripheral flange seated against the seating surface and extending through the inlet opening into the housing assembly. The filter assembly further includes a prefilter upstream of the V-bank filter and seated against an upstream face of the outer peripheral flange, a rectangular wall of the inlet frame surrounding the rectangular inlet opening, a plurality of posts arranged around the rectangular wall, first retainer clips mounted on the rectangular wall in a first plane releasably securing the V-bank filter along the seating surface, and a second retainer clips along the posts releasably securing the prefilter over the V-bank filter.

In some embodiments and according to yet another aspect, the rectangular inlet frame may itself be directly mounted to a wall structure of an building and thereby used as the housing for the primary filter and/or prefilter. The design is thus versatile allowing for fully enclosed housings, or open housings to be employed.

According to this feature, a rectangular inlet frame has a plurality of rectangular inlet openings, wherein the rectangular inlet frame defines a rectangular recess having a seating surface in surrounding relation of each rectangular inlet opening. The rectangular inlet frame can be molded of material comprising plastic to further include at least one divider grid to provide at least two of said rectangular inlet openings. A plurality of primary filters are installed into the rectangular inlet openings, each primary filter comprising at least one of a V-bank filter and a rectangular filter that includes filter media that is at least 3 inches deep, each primary filter having an outer peripheral flange seated along the seating surface with the primary filter extending through the rectangular inlet opening. First retainers mounted on the rectangular inlet frame releasably secure the primary filters along the seating surface.

The inlet frame can provide a unique method of servicing the filter assembly comprising: rotating first retainer clips to allow clearance to install the primary filter elements; installing the primary filter elements, one into each rectangular inlet opening; and thereafter, rotating the first retainer clips to secure the primary filter elements in the rectangular inlet openings. Prefilters may optionally be installed with similar methodology and a different set of rotatable retainer clips.

When used in an animal confinement facility, the substantially plastic housing (e.g. most structural components, but not necessarily fasteners or retainers) provides an animal confinement facility including at least one filter assembly. The combination comprises an animal confinement building having a ventilation system with an air flow inlet; a substantially plastic filter housing mounted inline with the air flow inlet to filter air flowing therethrough; and a primary filter mounted in the substantially plastic filter housing, the filter being at least a MERV 15 or higher and a filtration efficiency sufficient to prevent transmission of the PRRSV for filtering sub-micron sized viruses from an airflow stream flowing through the air flow inlet.

In still another aspect, embodiments of the invention provide a method of assembly an air filter housing that includes providing an inlet frame, an outlet frame, and a collapsed housing body having a generally flattened state, erecting the housing body to a tubular shape adapted to mate with the inlet and outlet frames, fastening the housing body to each of the inlet frame and the outlet frame, and mounting the housing to a building.

In yet another aspect, embodiments of the invention provide a method of installing a filter assembly into an animal confinement building that includes installing a bottom housing panel over an air flow opening in the animal confinement building, cutting the bottom housing panel to having an outlet opening matching the air flow opening, assembling an upper portion of the filter housing with the bottom housing panel, the upper portion including at least one inlet opening, and installing at least one filter element into the inlet opening.

In yet another aspect, embodiments of the invention provide an animal confinement facility including an animal confinement building having a ventilation system with an air flow inlet, a substantially plastic filter housing mounted inline with the air flow inlet to filter air flowing therethrough, and a primary filter mounted in the substantially plastic filter housing, the filter being at least a MERV 16 or higher and filtering sub-micron sized viruses from an airflow stream flowing through the air flow inlet.

Another aspect of the present invention is directed to a non-V-Bank filter alternative to V-Bank filters that have been employed in the filtration of PRRSV in hog confinement facilities. Preferably, deep pleating technology or in the alternative other self-supported media (e.g. such as fluted media packs having alternating face and fluted sheets as disclosed in U.S. Pat. No. 5,820,646) may be utilized. Media is selected that has sufficient air flow characteristics, and with at least a MERV 14 rating (preferably rated a MERV 15 or 16) and capability to filter the PRRSV virus at rated air flows experienced in animal confinement applications.

Another aspect of the present invention is directed a more compact filter element that can handle the air flow of a standard 12 inch header V-bank filter. Testing has found that filter elements less than 12 inches can be accomplished in some embodiments, more preferably less than 10 inches, and most preferably around 6 inches in depth. Comparable filtration performance and air flow capacity is demonstrated in a filter element package occupying about half the depth and thereby about one half of the volume. As filter banks occupy substantial envelope space in confinement buildings, this more compact filter offers substantial space savings for animal confinement buildings. Further, this also saves on shipping costs of relatively bulky filters as twice as many filters can be shipped in the same size freight, resulting in freight cost savings of ½.

Alternatively 12 inch header depth may also be used in some embodiments providing for greater capacity, increased flow potential and/or longer filter life. Fewer filters may be needed in systems employing larger capacity filters. In fact air flow benefits can be had with larger pleat packs of 10 inches or greater. For example, for buildings demanding greater air flows desires for the animal environment, even greater air flows can be achieved by replacing V-bank filters with certain deep pleated embodiments (e.g. pleats may be between 8-11 inches, or other range) in embodiments such as FIG. 11, and encompass these inventive aspects. This is because the volumetric air flow advantage of embodiments are substantial as compared to the V-bank (see e.g. FIG. 38).

According to one aspect, a method of removing porcine reproductive and respiratory virus (PRRSV) from an air flow stream into an animal confinement facility, comprises: placing a filter element along the air flow stream to filter out PRRSV; arranging filter media in a frame to provide the filter element, the filter media being in a non-V bank configuration; and having the filter media comprise: a MERV rating of at least 14 and an efficiency sufficient to adequately filter the PRRSV; and an air flow of greater than 200 cfm @ resistance of 0.2 inch water gauge, per square foot occupied by the filter element transverse to the air flow stream.

Another inventive aspect is directed to a non-v-bank filter element with certain PRRSV removal capabilities and a high air flow capacity. The filter element is adapted for filtration of porcine reproductive and respiratory virus (PRRSV) from an air flow stream to an animal confinement building, and comprises: a rectangular frame; a filter media pack extending across the frame in a non-V-bank configuration, the filter media pack having a depth of less than 8 inches such that in combination with the frame the filter element has a depth of less than 10 inches in a direction perpendicular to a plane defined the rectangular frame, the filter media pack comprising: a MERV rating of at least 14 and a filtration efficiency sufficient to prevent transmission of the PRRSV; and an air flow of greater than 200 cfm @ resistance of 0.2 inch water gauge, per square foot occupied by the filter element transverse to the air flow stream.

Yet another aspect is directed toward a filter element that may be in a non-v-bank configuration with a high air flow capacity and a MERV rating of at least 14. The filter element comprises: a support frame; a filter media pack comprising filter media extending across the frame and having depth of greater than about 3 inches, the filter media pack comprising: a MERV rating of at least 14; and a volumetric air flow capacity that is in excess of 500 CFM/cubic foot of filter envelope@ resistance of 0.2 inch water gauge.

The filter element according to the above aspect may have one or more of the following features: a MERV 15 or 16 rating, and a filtration efficiency sufficient to prevent transmission of the PRRSV; wherein the filter media pack is a pleat pack having pleat flanks and pleat tips, and comprising adhesive spacers around pleat tips at at least one of the inlet and outlet faces, the spacer adhesively securing adjacent pleat tips; embossments integrally formed into the pleat flanks; an air flow capacity greater than 300 cfm @ resistance of 0.2 inch water gauge, per square foot occupied by the filter element transverse to the air flow stream; the support frame being rectangular including a frame sidewall and a frame header extending outwardly around the sidewall to define a larger perimeter than the sidewall; a rectangular gasket along one side of the frame header; a volumetric air flow capacity that is in excess of 600 CFM/cubic foot of filter envelope@ resistance of 0.2 inch water gauge (and more preferably greater than 700); pleats extending a pleat depth greater than about 3 inches and less than 11 inches, the pleats being having embossments extending between pleat tips and adhesive spacer supports extending around pleat tips and connecting with adjacent pleat tips; a compact element (versus standard V-bank) wherein the filter media pack has pleat depth between 4 inches and 8 inches; a pleath depth of at least about 3 inches with synthetic polymeric fibers that are heat set and embossed and have spacer supports between pleat flanks to provide structural integrity sufficient an air flow of greater than 300 cfm per square foot of filter element; a filter media composite with a carrier layer and an efficiency layer, the efficiency layer having a higher filtration efficiency than the carrier layer and providing for filtration of PRRSV, wherein the efficiency layer comprising a polymer with a hydrophobic additive (the efficiency layer may comprises polypropylene fibers with a fluorine additive); a filter element span each way perpendicular to the air flow of between 20 and 48 inches with adjacent pleat tips are spaced between about ½ and 2 centimeter, and the pleat tips are flattened between about 1-3 millimeters, the filter media being at least one of a MERV 15 and a MERV 16; the filter media pack comprises a non-V-bank configuration, the filter media pack being pleated or fluted.

Finally another inventive aspect is directed toward a filter system in an animal confinement building, which may comprise any of the filter elements described above. Such a filter system for filtration of air for animals may comprise according to certain advantageous embodiments: a filter housing mounted to an animal confinement building, the animal confinement building generating an air flow though the filter housing; a filter element installed into the housing in sealed relation, the filter element including: a frame; a filter media pack supported by the frame in a non-V-bank configuration, the filter media pack having a depth of greater than 2 inches and less than about 11 inches such that in combination with the frame the filter element has a depth of about 12 inches or less in a direction perpendicular to a plane defined the rectangular frame, the filter media pack comprising a MERV rating of at least 14.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 35 is an enlarged schematic plan view of two pleats along either upstream or downstream face of the pleat filter pack used in the filter element of FIGS. 33 and 34 to better illustrate integral embossments in the pleat flanks and bead spacers and supports that made be interposed between adjacent pleat flanks.

FIG. 36 is a schematic illustration of the synthetic filter media employed in the filter pack of FIG. 33 showing a carrier layer and a high efficiency hydrophobic layer.

FIG. 39 is an isometric exploded view of a compact pleat filter assembly according to an alternative embodiment of the present invention with different height and width dimensions.

FIG. 40 is an assembled isometric view of the filter assembly of FIG. 39.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Before turning to non-v bank embodiments, first description will be had as to various preferred filtration systems and embodiments in which V-bank filters may be employed, and in which the non-V-bank filter according to FIG. 11 or FIGS. 33-40 may be employed as substitute. Further, in any of these embodiments or others alluded to in other patent publications referenced, the housings therein and building space utilized may be modified to a shallower depth and more compact package, thereby as a significant space savings.

Figure 1:
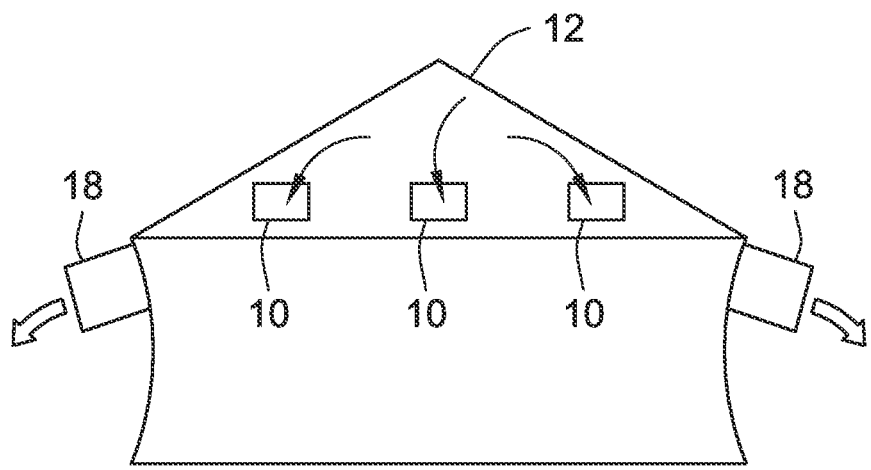
FIGS. 1-3 are schematic views of negative pressure, neutral pressure and positive pressure animal confinement buildings employing a filter assembly according to embodiments of the present invention.
Figure 2:
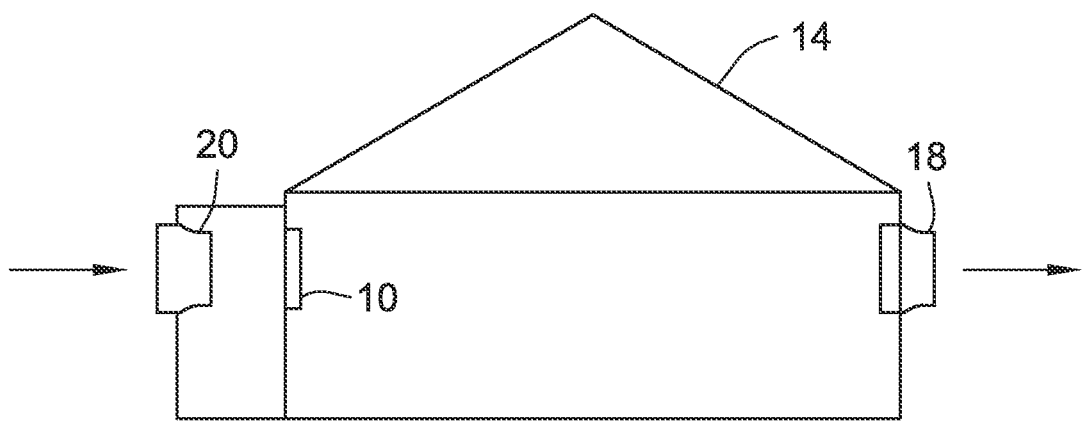
Figure 3:
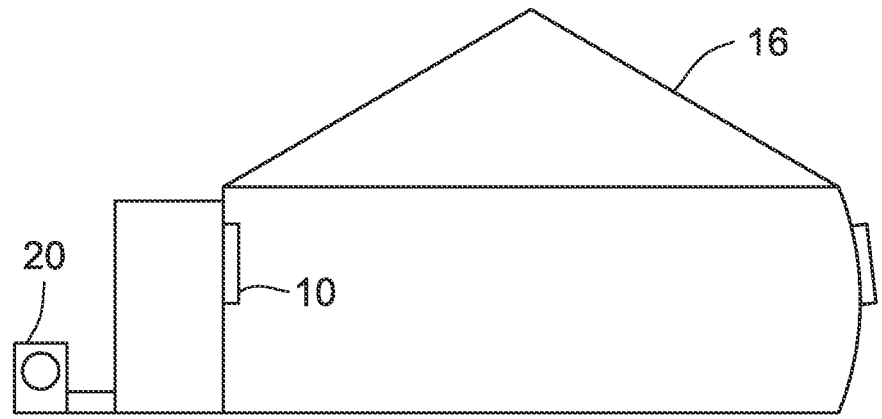

In accordance with various embodiments, a filter assembly 10 is schematically illustrated in animal confinement building environment in FIGS. 1-3. Different environmental configurations are shown in FIGS. 1-3 for different buildings 12, 14 and 16 in FIGS. 1-3 respectively.

For example, in the negative pressure system and building 12 of FIG. 1, exhaust fans 18 are arranged on the outer walls of a building to suck and blow air out of the building, thereby creating a negative pressure differential on the inside of the building 12 relative to the outside ambient environment. A plurality of filter assemblies 10 may be installed such as in the roof and structure of such a building 12 as illustrated in FIG. 1. With holes cut in the roof corresponding to openings and airflow inlets in the building, the filter assemblies 10 are arranged over such inlet openings to filter the air entering the building 12.

All references, including publications, patent applications, and patents cited herein are hereby incorporated by reference to the same extent as if each reference were individually and specifically indicated to be incorporated by reference and were set forth in its entirety herein. Specifically, the entire teachings and disclosure of Patent Application No. 61/490,896 (filed May 27, 2011), which discloses embodiments of a V-bank air filtration system such as for animal confinement facilities, are incorporated herein by reference thereto.

In the second environment and embodiment of FIG. 2, the filter assembly is shown installed in a wall of the building 14 downstream of an inlet blower 20, which exerts positive pressure on the filter assembly 10 to force air through the filter assembly 10 and into the building 14. Building 14, however, is a neutral pressure having a similar or slightly different pressure than the ambient environment as embodiment also includes an exhaust fan 18 similar to the first embodiment to blow and exhaust air forcibly from the building. Depending upon the balance between the exhaust fan 18 and inlet blower 12 in the neutral pressure building 14 of FIG. 2, either the same or slightly positive or negative pressure may be developed in the building relative to the outside ambient environment, but is considered to be a neutral pressure configuration due to both the inlet blower 20 and exhaust fan 18 combination that attempts to maintain a relative true neutral pressure.

Yet a third environment and embodiment employs a positive pressure building 16 in which filter assemblies 10 may also be installed into the wall of the building 16. In this embodiment, however, there is no exhaust fan means, but instead only inlet blowers 20 that take outside air and forcible push air through the filter assembly 10 to create a positive pressure inside the building 16 that is greater than the outside ambient environment. This higher pressure contained within the building will cause any air pressure within the building to or flow through cracks to be from the inside to the outside. Typically, a one-way outlet such as a louvered outlet panel or other check valve type structure is provided to allow for organized exhaust flow ventilation of air from the inside to the outside of the building due to the higher pressure created inside of the building by virtue of inlet blower 20.

Figure 4:
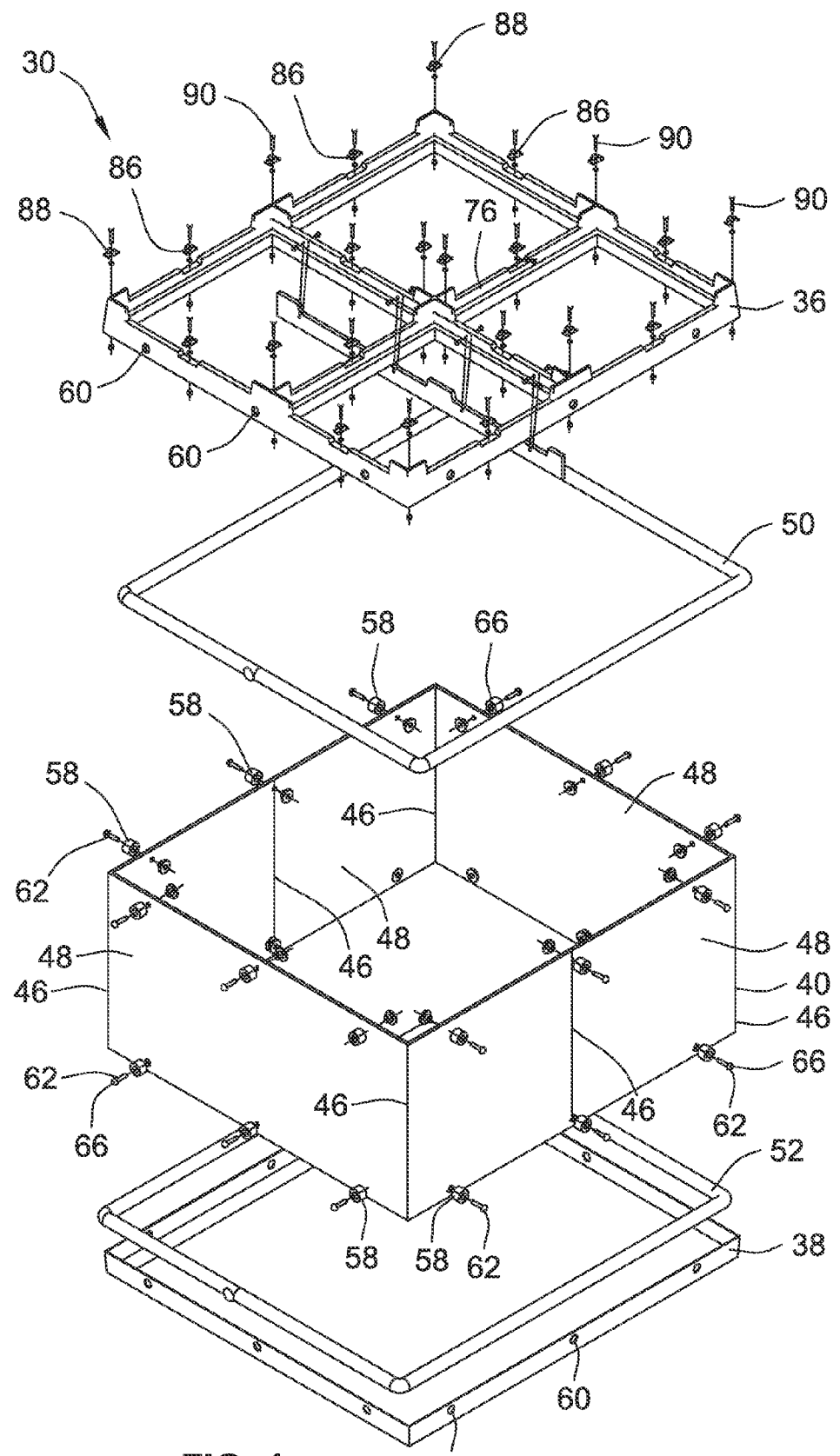
FIG. 4 is an exploded isometric view of a filter housing assembly according to an embodiment of the present invention.
Figure 5:
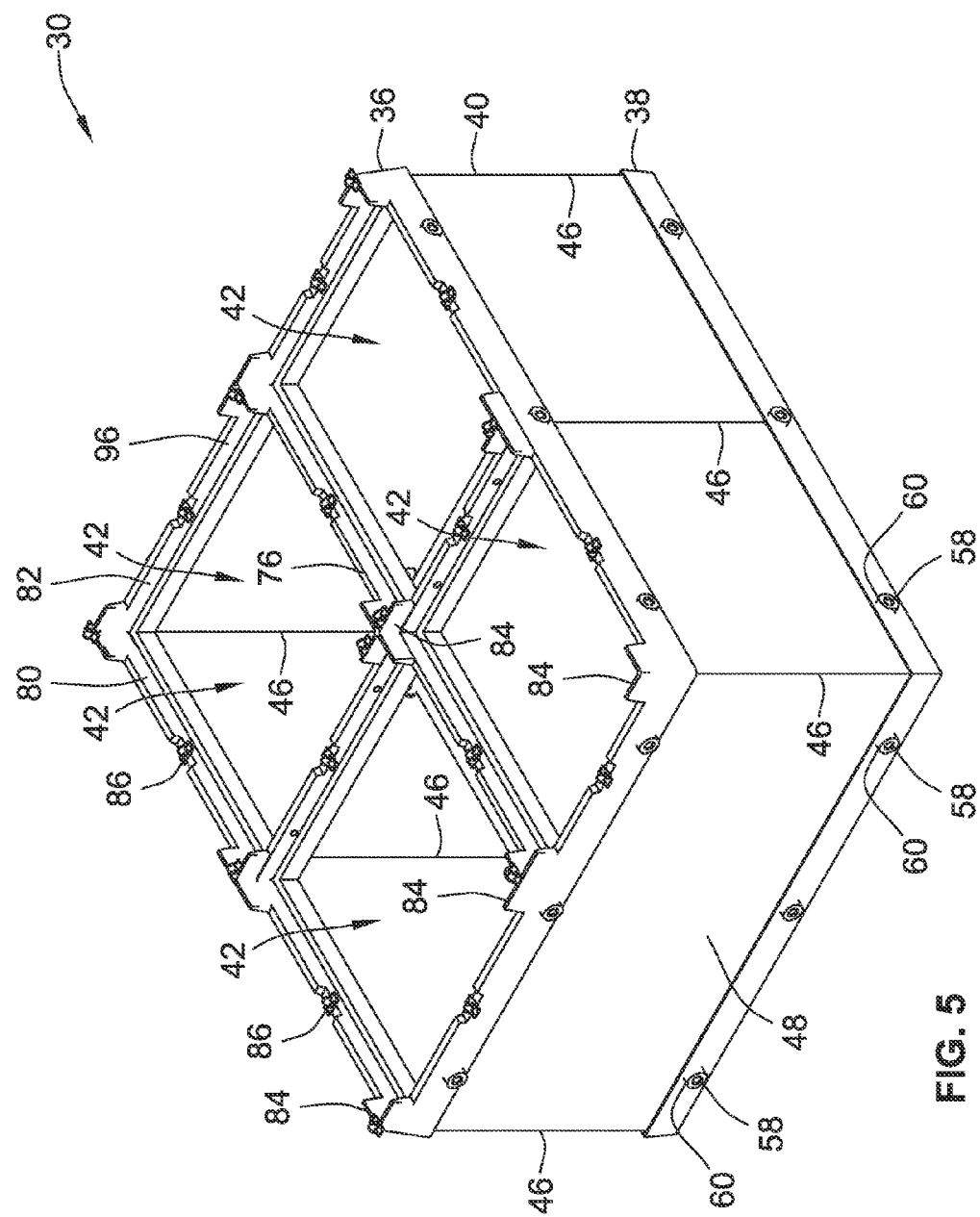
FIG. 5 is an isometric view of an assembled filter housing assembly according to an embodiment of the present invention.

Now that various embodiments and environments for the filter assembly 10 have been described, attention will now be drawn in greater detail to the filter housing assembly 30 shown in greater details in FIGS. 4 and 5 and also the overall filter assembly 10 which further includes a primary filter such as V-bank filters 32 (shown in FIG. 10) or a single-header box filter 100 (shown in FIG. 11), and panel prefilters 34 (shown in FIG. 12) that are installed in combination with filter housing assembly 30.

Figure 6:
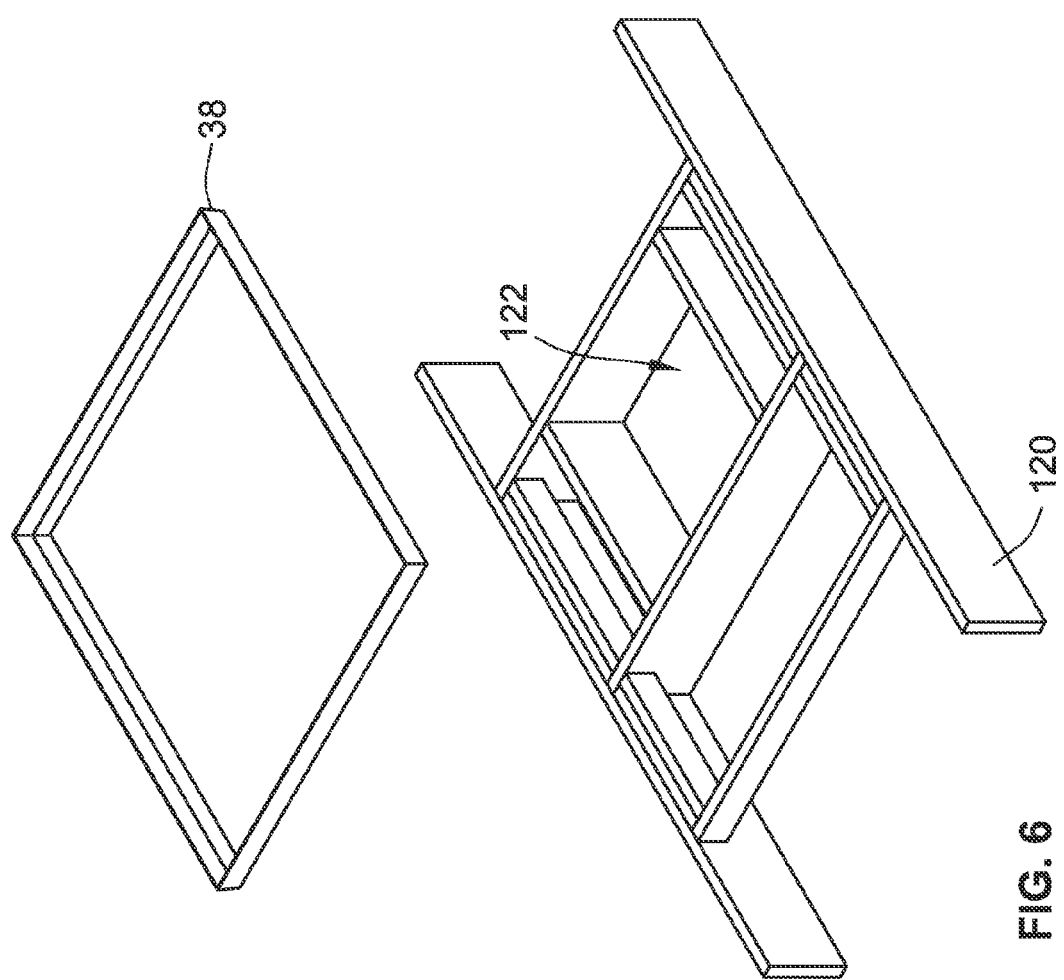
FIGS. 6-9 show the progressive installation and assembly of a filter housing assembly onto the truss structure of an animal confinement building in accordance with an embodiment of the present invention, with FIG. 9 additionally illustrating the filter housing assembly in combination with pre-filter panel filter elements and V-bank filter elements in accordance with embodiments of the present invention.
Figure 7:
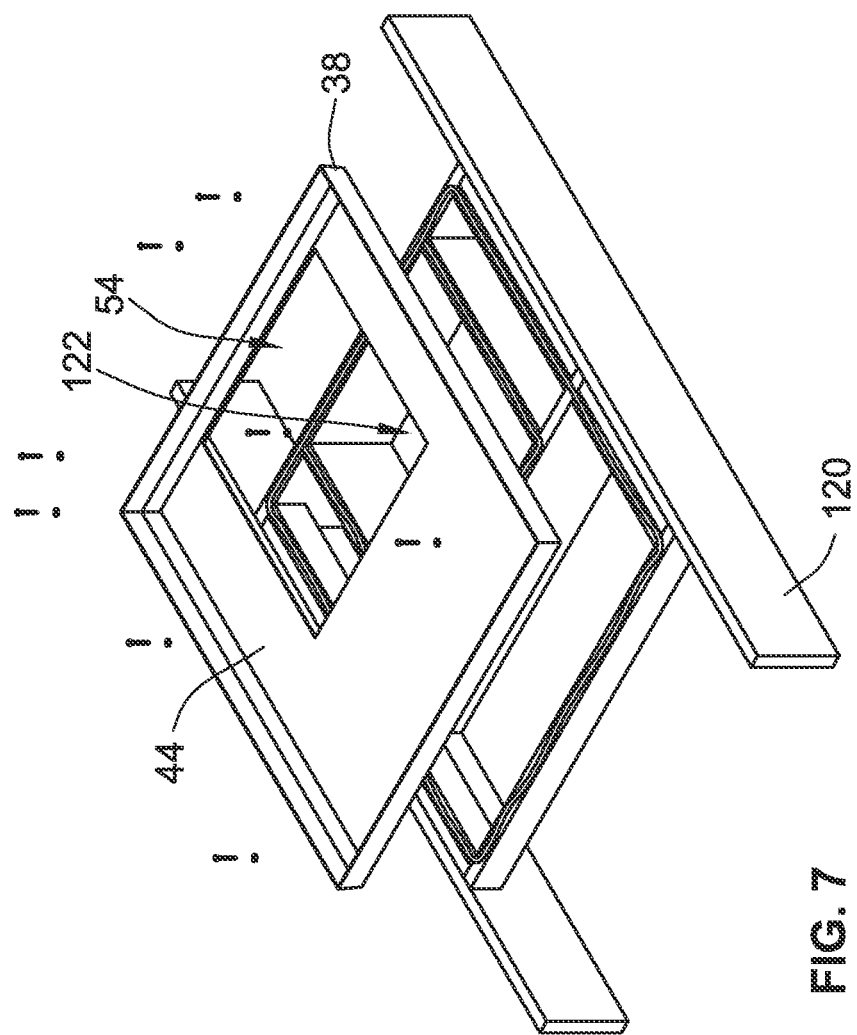

Referring to FIGS. 4 and 5, the filter housing assembly generally includes three primary structural components including a rectangular inlet frame 36, a rectangular outlet frame 38 and a housing body 40 that is generally interposed between the rectangular inlet frame 36 and the rectangular outlet frame 38 in an assembled state. The rectangular inlet frame 36 defines at least one, and typically multiple rectangular inlet openings 42, which are adapted to convey and receive air into the overall housing structure. The rectangular outlet frame may be formed with a preformed hole or outlet opening as well, but in a preferred embodiment has a solid panel 44 (shown in FIGS. 7 and 8), which may then be cut to exact specifications to match the exact flow opening in the structure of the animal confinement building as can be seen with later reference to FIGS. 6 and 7 showing the custom cutting of such an opening.

Figure 15:
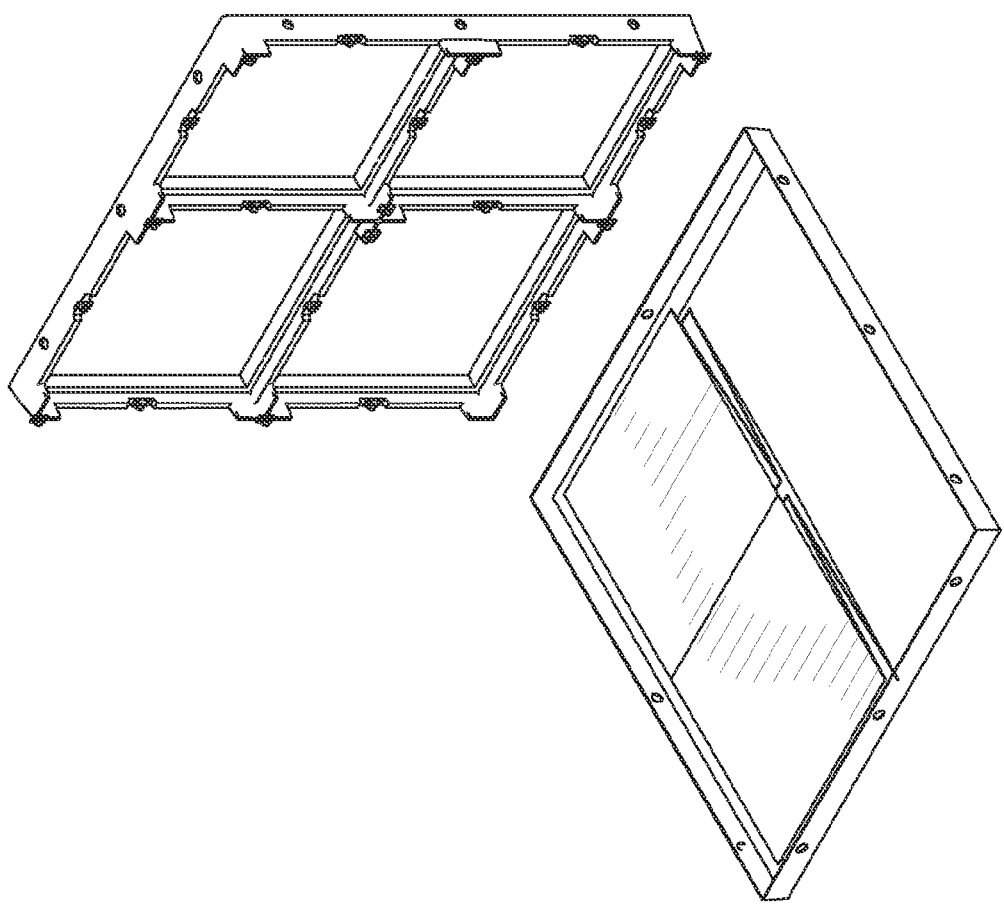
FIGS. 15-23 provide illustrations of two-filter and four-filter assemblies in various stages of assembly, in accordance with embodiments of the invention.
Figure 16:
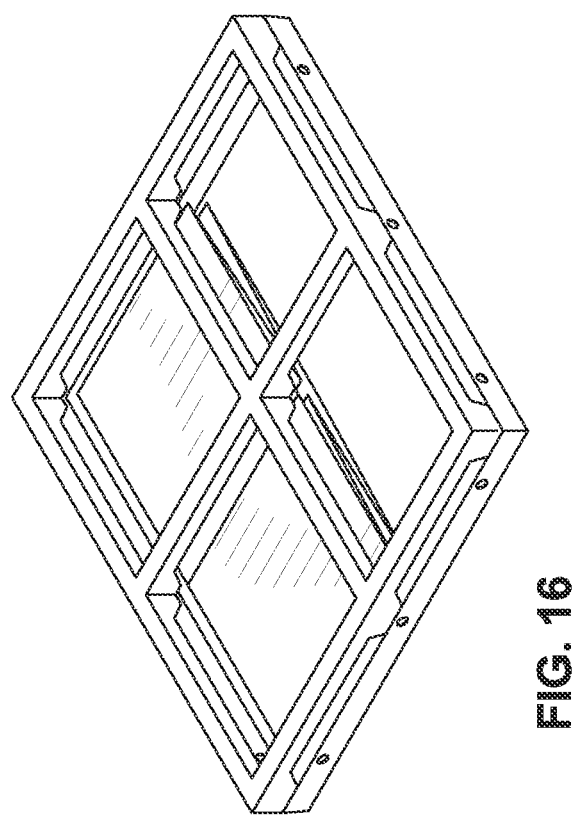
Figure 17:
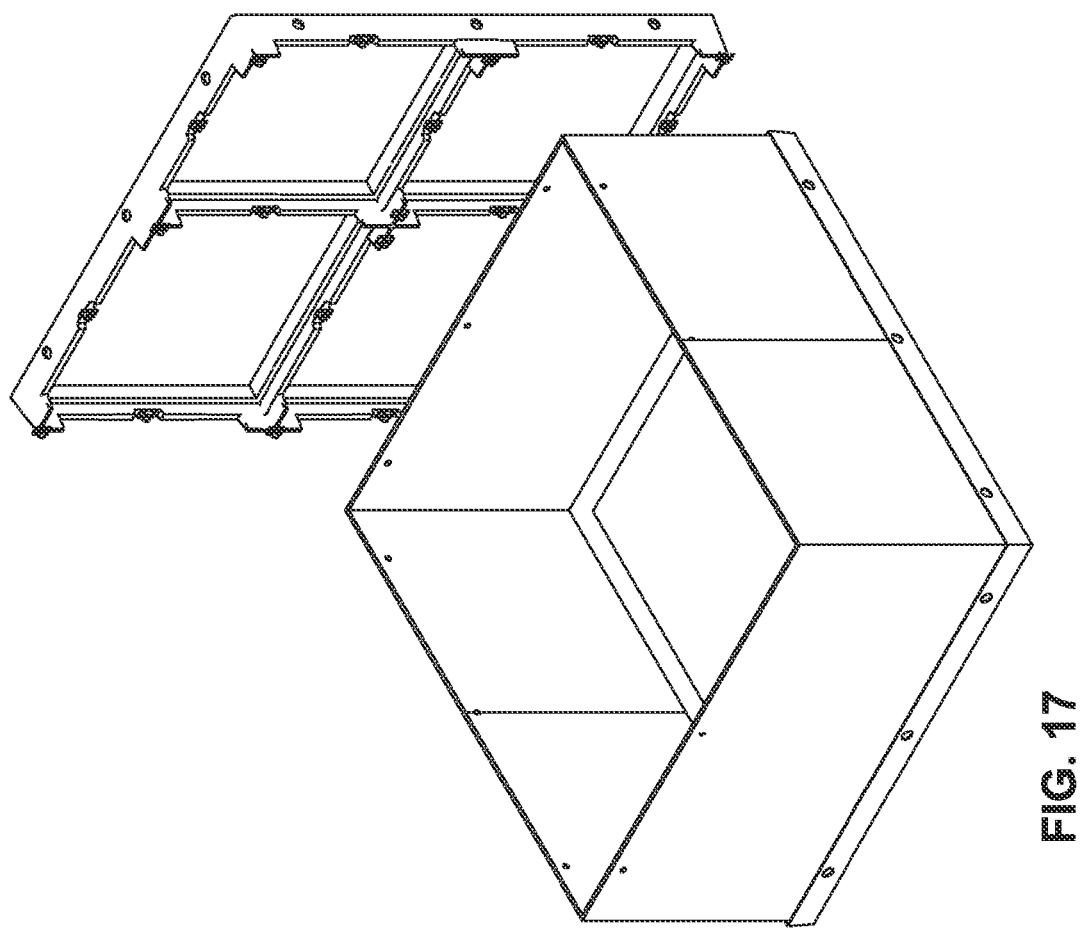
Figure 18:
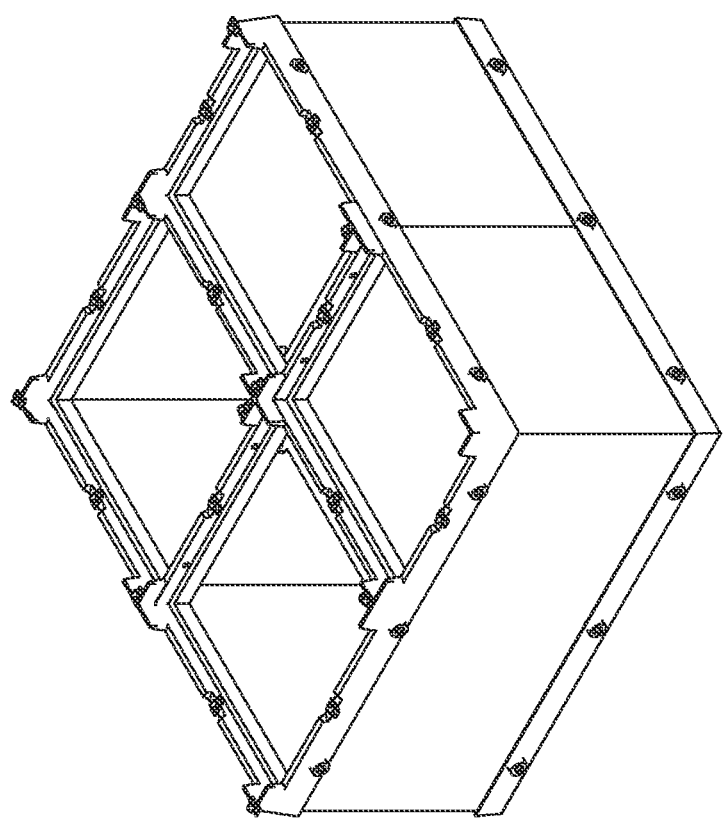
Figure 19:
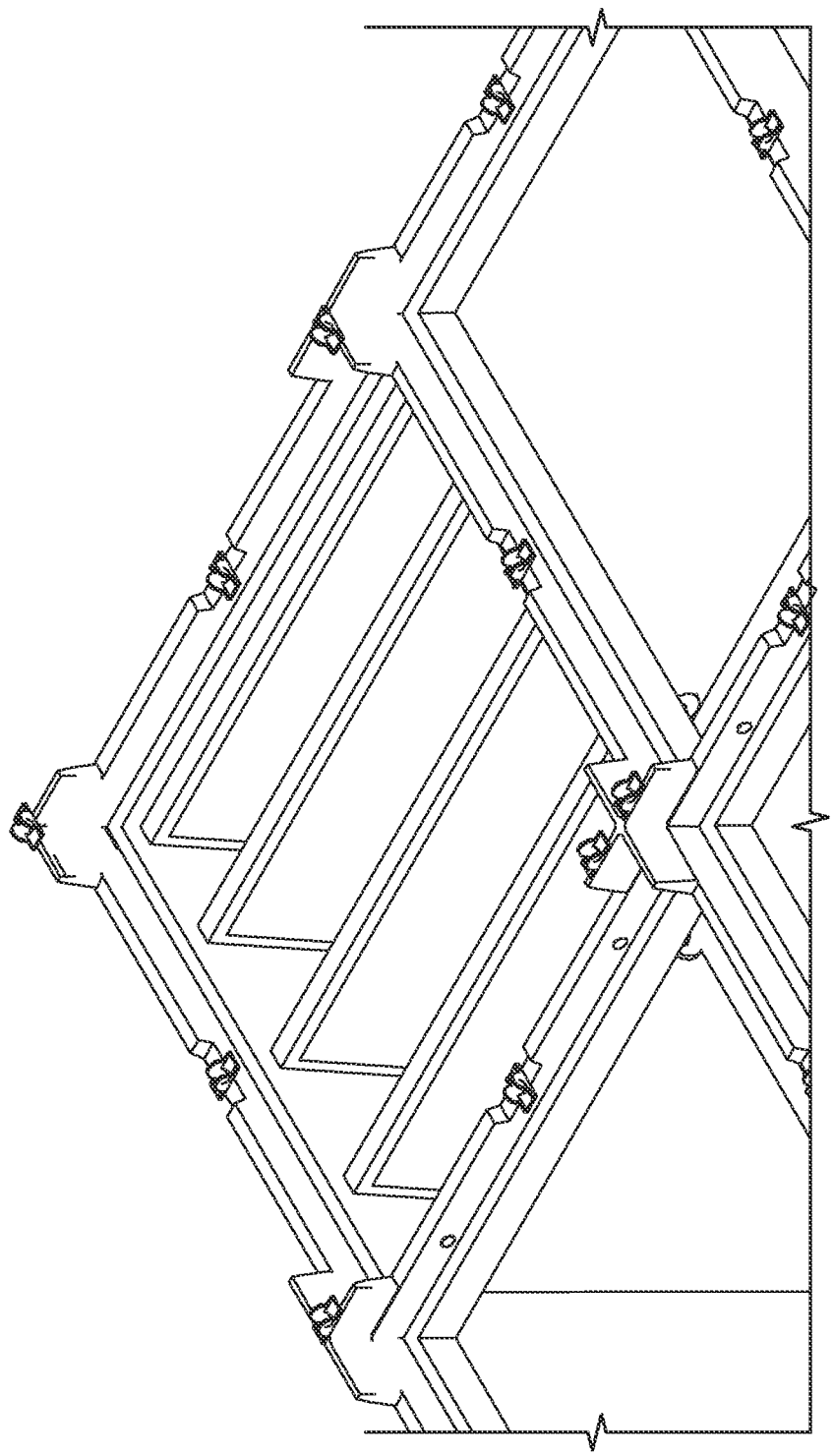
Figure 20:
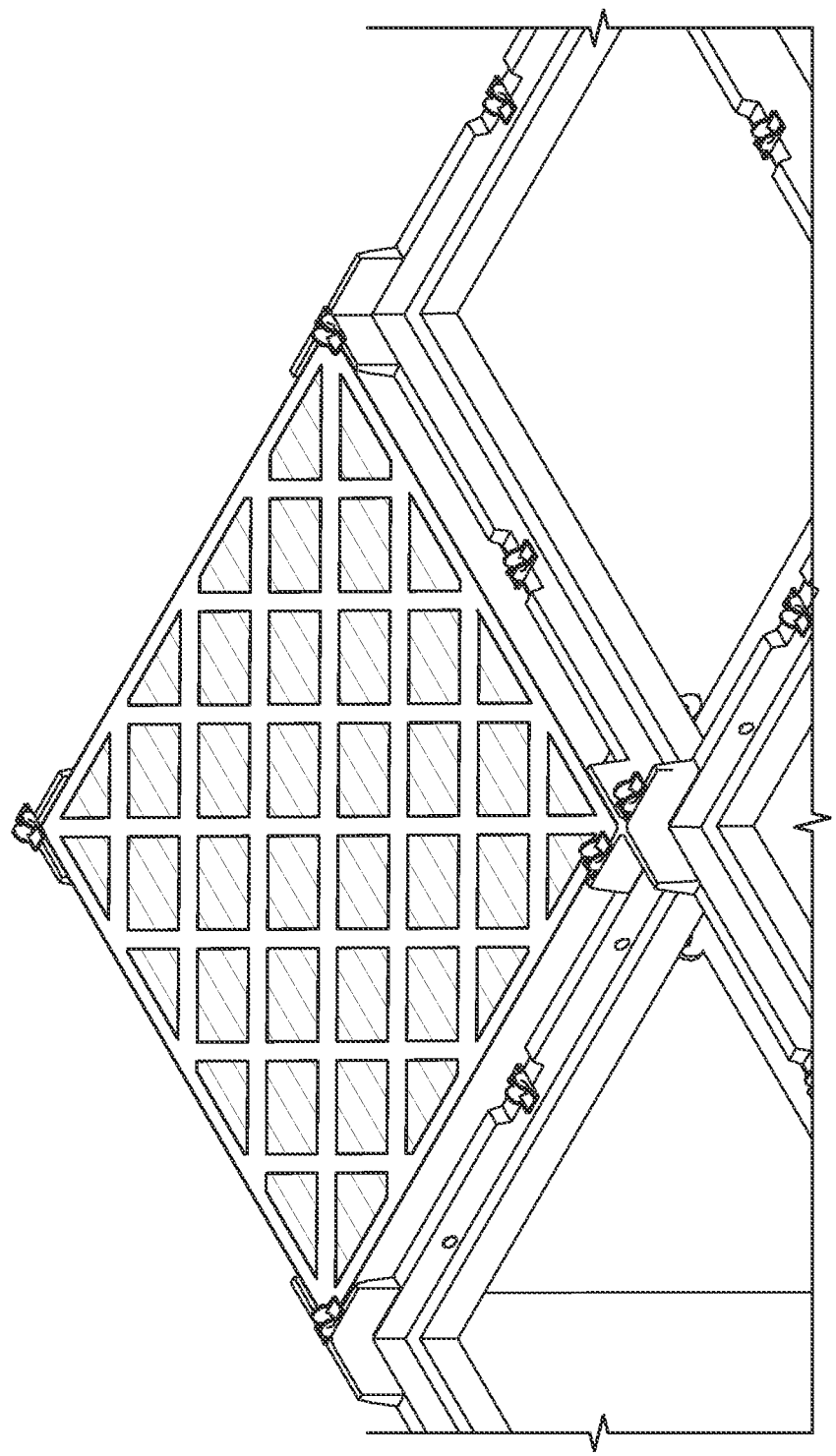
Figure 21:
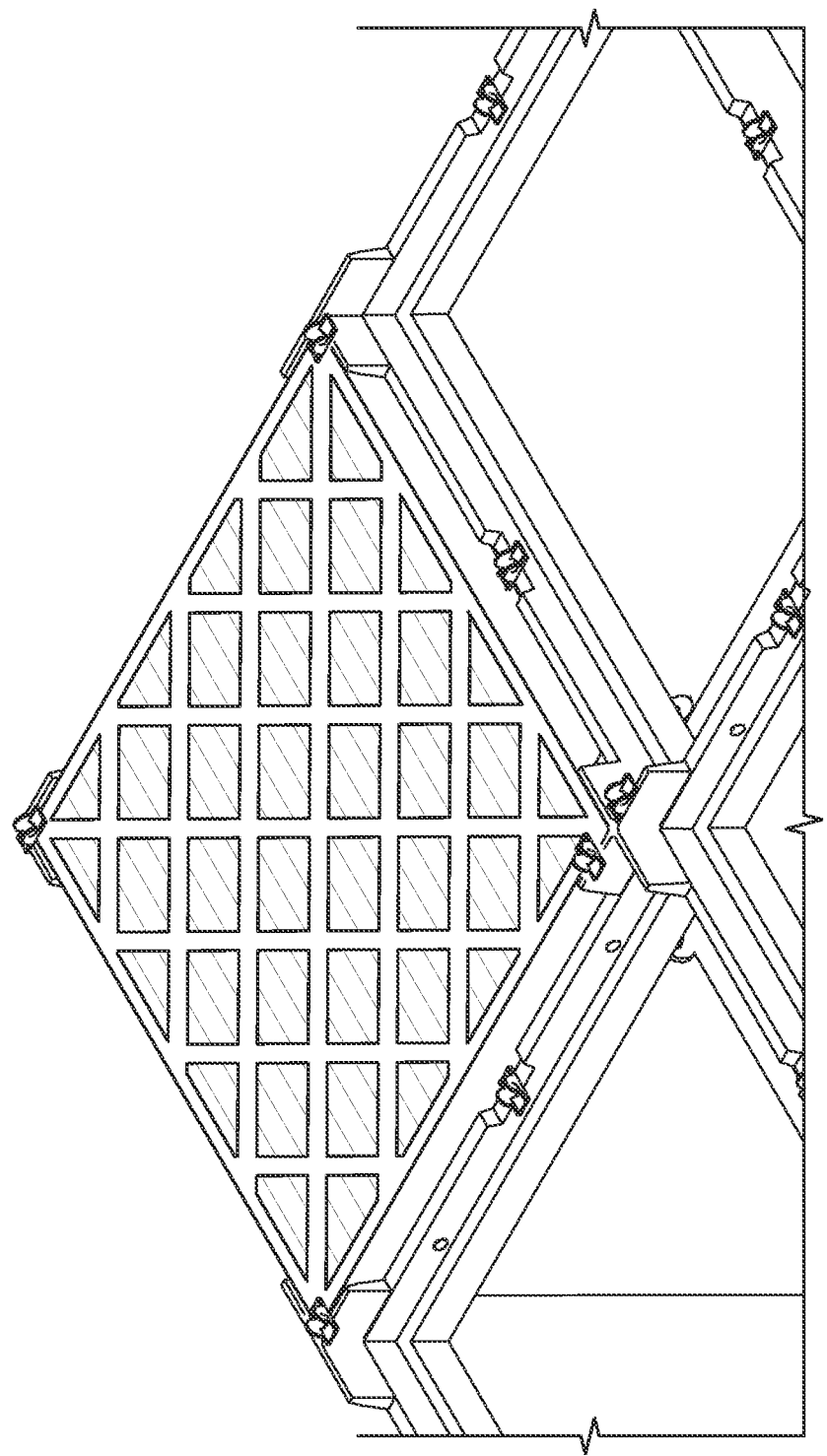
Figure 22:
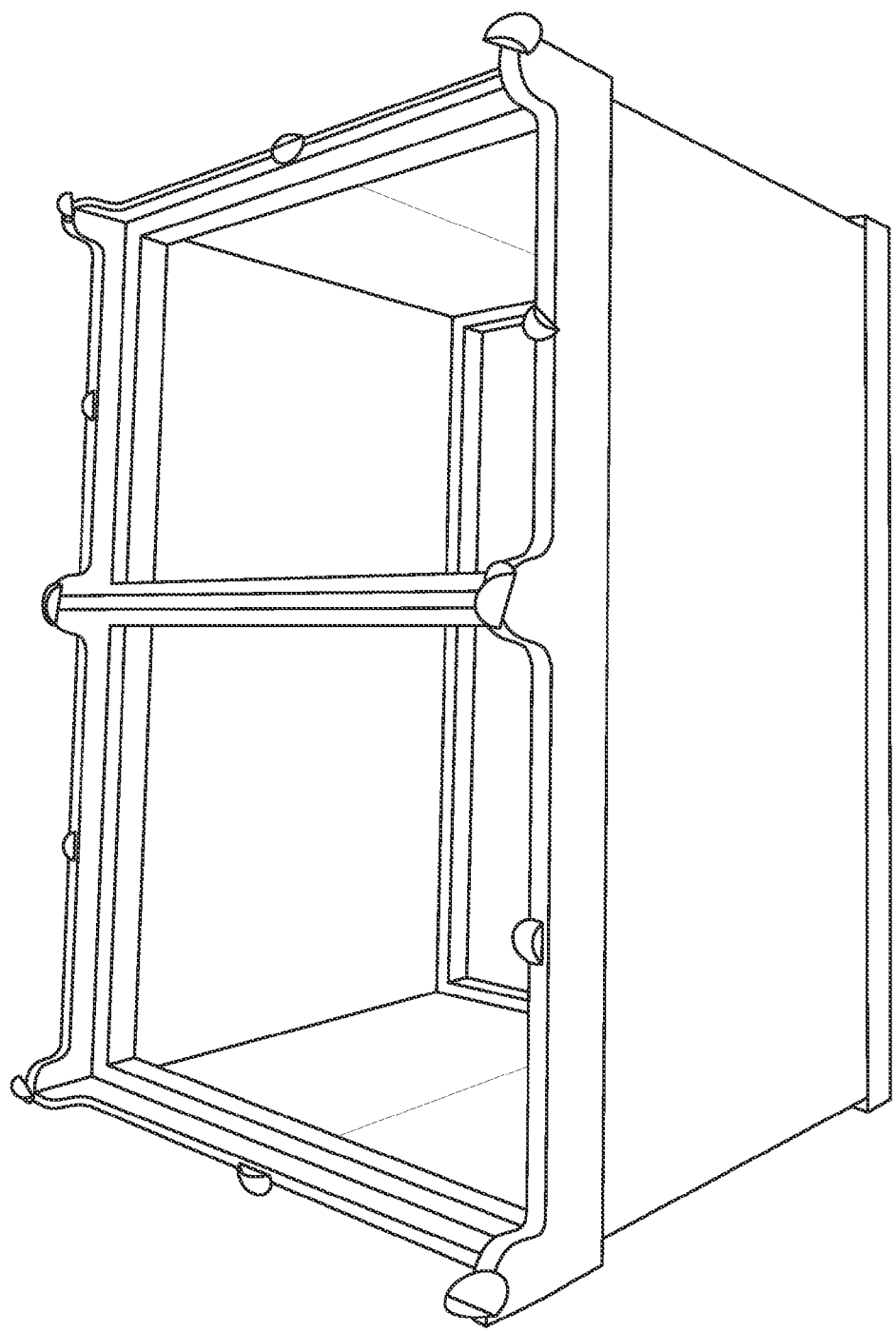
Figure 23:
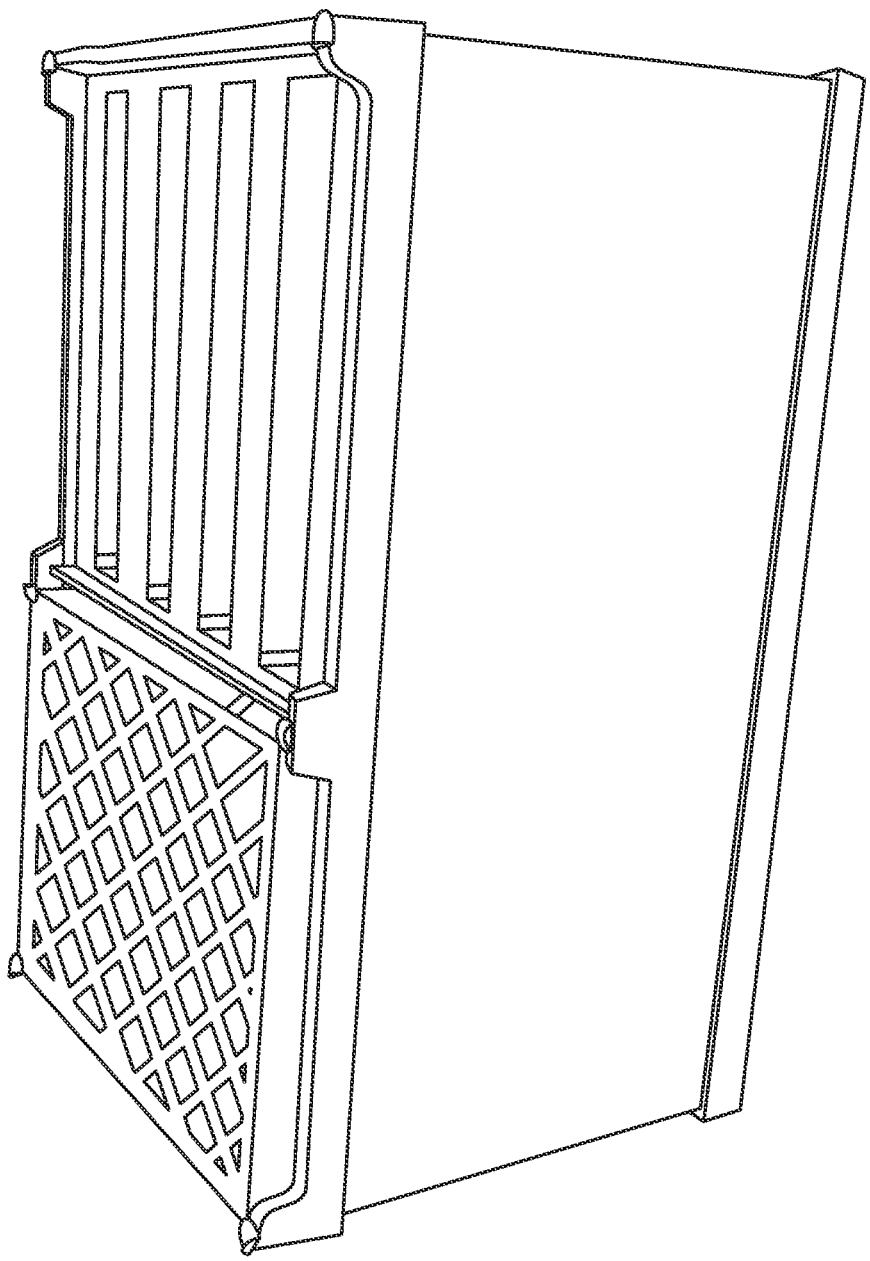

An advantage of this particular design and embodiment is that it can allow or afford the ability to have a compact and flattened state for shipping and can easily be assembled on site. For example, the housing body 40 is collapsible and has a flattened shipping state as shown in FIGS. 15 and 16. For example, the inlet and outlet frames 36, 38 may be formed of relatively rigid and stiff molded plastic material to provide for complex structures whereas the tubular housing body 40 may be constructed of relatively thin, but sufficiently stiff when erected plastic corrugated wall board material. Suitable materials for the housing body include corrugated wallboard material from Carter Associates, Inc., such as is commercially available or otherwise which may be used in containers such as those described in U.S. Patent Pub. No. 2005/0150812 (Carter), or U.S. Pat. No. 5,322,213 (issued to Carter et al.), or U.S. Pat. No. 5,351,846 (issued to Carter), the entire teachings and disclosures of which are incorporated herein by reference thereto. Other solid wall or multiply wallboard material or multi-ply plastic material may also be utilized.

This material may have six integral hinges 46, which may be provided at each one of the four corners of the structure as well as optionally, an additional two integral hinges 46 may be formed intermediate to the four side panels 48 of the housing body 40. Thus, at least four integral hinges are provided to allow the housing body 40 to fold and collapse to a substantially flattened state to reduce the shipping volume and thereby shipping cost. When erected, however, a relatively stiff structure is provided by virtue of the stiff nature of the corrugated plastic wall board material used in the housing body 40. Additionally, provided as part of the housing assembly 30 is an upper gasket 50 and a lower gasket 52, which may be large rectangular rope gaskets each. These each get installed and compressed axially between the housing body 40 and the rectangular inlet frame and rectangular outlet frames 36, 38, respectively, when the housing assembly 30 is fully assembled. Typically, these will be compressed around 20-30% when installed and provide a sealed box-like enclosure so that unfiltered air is forced through the inlet openings 42 and eventually through the outlet opening 54 which is eventually cut into the solid panel 44 of the rectangular outlet frame 38.

In an embodiment and an optional, but preferred feature, is also the use of a plurality of snap fasteners, which may take the form of snap buttons 58 that are installed, preferably onto the housing body proximate the upper and lower edges of the side panels 48 for snap fit into corresponding mounting holes 60 formed into the inlet and outlet frames 36, 38 as illustrated. While FIG. 4 shows exploded assembly view of the snap buttons 58 for illustration purposes, it will be understood that typically the snap buttons 58 will be fully installed and assembled at the factory such that these structures do not need to be assembled onsite. The snap buttons 58 may include a screw, or bolt, 62 and a snap button projection 66 that has an enlarged and flexible head that can be press fit through a corresponding mounting hole 60 and has a resiliently flexible nature to flex outward and form an enlarged head, larger than the mounting hole 60 to prevent dislodgement therefrom.

During assembly, the side panels 48 of the housing body 40 will be erected into a rectangular and tubular shape and then the housing body will pressed onto the lower gasket 52 on the lower outlet frame 38 until the snap buttons 58 are received into the corresponding mounting holes 60 formed around the perimeter of the outlet frame. Thus, the housing body 40 is received into the periphery of an L-shaped bracket portion 68 of the outlet frame 38 with the lower gasket 52 fitting on a sitting recess formed by that L-shaped bracket portion 68. With the snap buttons 50 received in the mounting holes 60, the lower gasket 52 is maintained in a state of compression, thus causing a sealing relationship therebetween.

Figure 14:
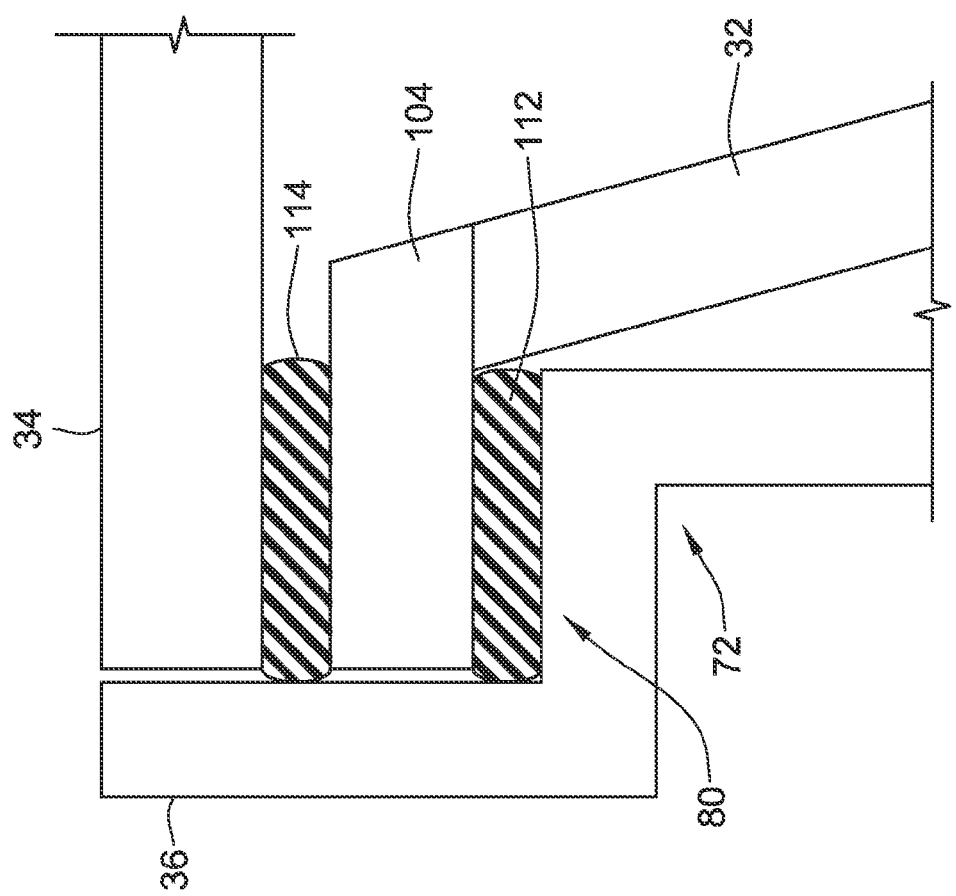
FIG. 14 is a close up illustration showing how the pre-filter and V-bank filter and corresponding seals are arranged relative to the inlet frame of the fuel filter assembly.

Similarly, for the inlet frame 36, there is an L-shaped bracket portion 72 with an seating recess 74, which also receives upper gasket 50. With the housing body 40 already attached to the outlet frame, the inlet frame may now be situated and received onto the other edge of the housing body 40 with upper gasket 50 compressed therebetween again until the snap buttons 58 are received into the corresponding mounting holes 60 of the inlet frame 36, which run again around the periphery of the inlet frame 36. Again, the housing body 40 is thus received into the inner periphery of the L-shaped bracket portion 72 (shown in FIG. 14) of the inlet frame 36 with the upper gasket 50 maintained in a state of compression when the snap buttons 58 are received in the mounting holes 60 thereby providing again a sealed relationship between the housing body 40 and the inlet frame 36.

On the side opposite the L-shaped bracket portion 72 (shown in FIG. 14), the inlet frame 36 defines structure for receiving and mounting the filter elements, which may include the primary filter such as V-bank filter 32 and panel pre-filter 34. In particular, the exposed side of the inlet frame includes preferably grid work 76 (shown in FIGS. 4 and 5) to divide the inlet space into a plurality of smaller inlet openings 42. Surrounding each smaller rectangular inlet opening 42 is a rectangular seating surface 80, which is in turn surrounded by a rectangular wall 82. Further, a plurality of posts 84 are arranged at different locations around the rectangular wall 82 to provide for an elevated plane. These posts 84 may be provided, for example, at the corners of the rectangular wall structure.

Figure 13:
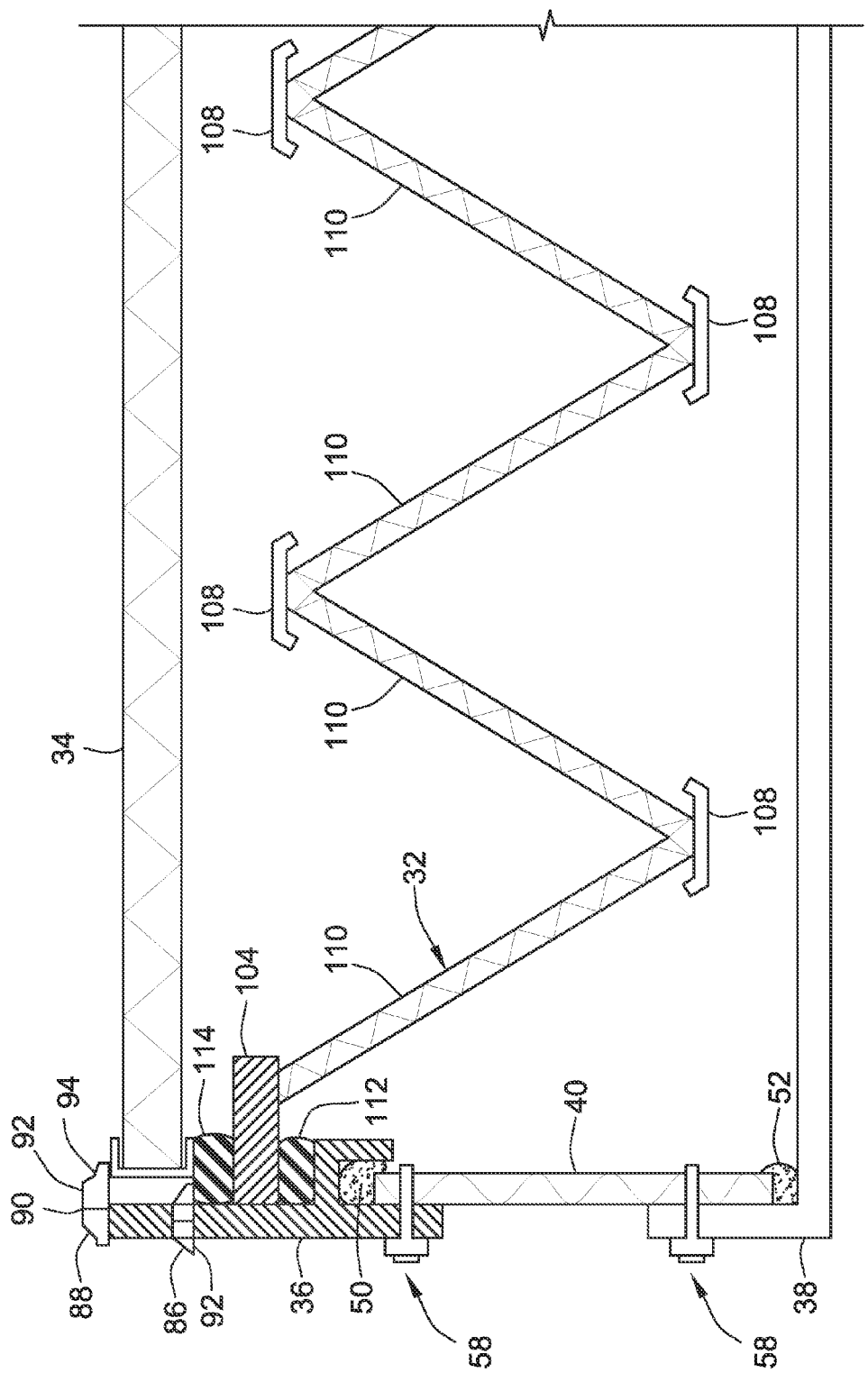
FIG. 13 is a cross sectional view of an overall filter assembly including a filter housing assembly, a primary V-bank filter and a panel filter according to an embodiment of the present invention.

Additionally, a first set of retainer clips 86 are mounted on the rectangular wall 82 in a first plane for releasably securing the V-bank filter 32 along the seating surface 80. Further, a second set of retainer clips 88 are provided along the posts 84 and arranged in a second plane for releasably securing the pre-filter 34 over the V-bank filter 32. Again, the clips 86, 88 while shown for purposes of illustration in FIGS. 4 and 13 as unassembled would typically be assembled and installed at the factory rather than onsite. Each clip may, for example, include a screw 90 and a clip body 92 (shown in FIG. 13) and have a compression portion 94 (shown in FIG. 13) that is movable over the rectangular recess 96 (shown in FIG. 13) that is formed by virtue of the seating surface 80 and rectangular wall 82. In this manner, the compression portion 94 may be moved over and into engagement to retain and preferably compress the filter toward the inlet frame 36. In the case of the V-bank filter 32, the first retainer clips 86 serve to compress seal between the V-bank filter 32 and the inlet frame 36 to ensure a sealing connection therebetween.

To the extent not clear from the foregoing, it can be noted that the filter housing assembly 30 may be configured to have either one inlet opening 42 or a plurality of inlet openings 42 and all of the claims appended hereto are broad enough to include both possibilities. For example, a relatively small and compact filter unit may be provided with one rectangular opening. Typically, at least two and as shown, more preferably four or more inlet openings 42 are provided to respectively receive four or more respective V-bank filter 32 elements and panel pre-filter 34 elements.

Figure 10:
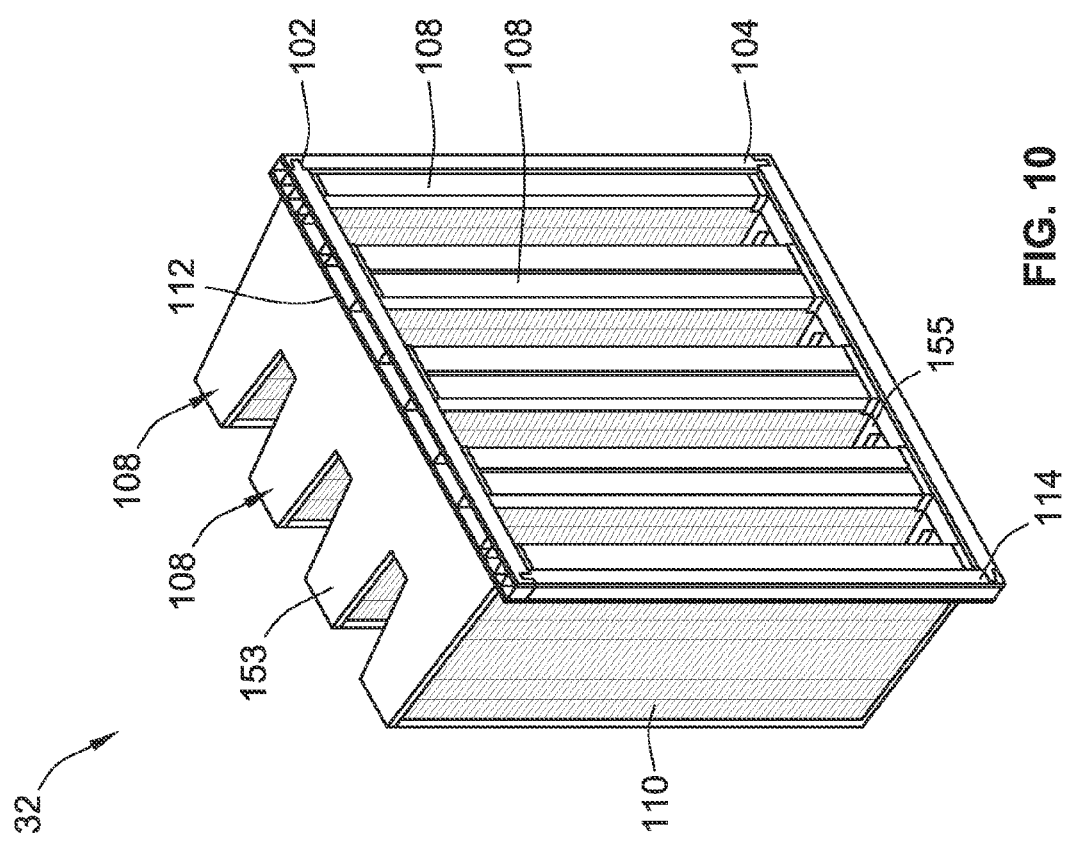
FIG. 10 is an isometric view of a V-bank filter which may be used and installed into the filter housing assembly.
Figure 11:
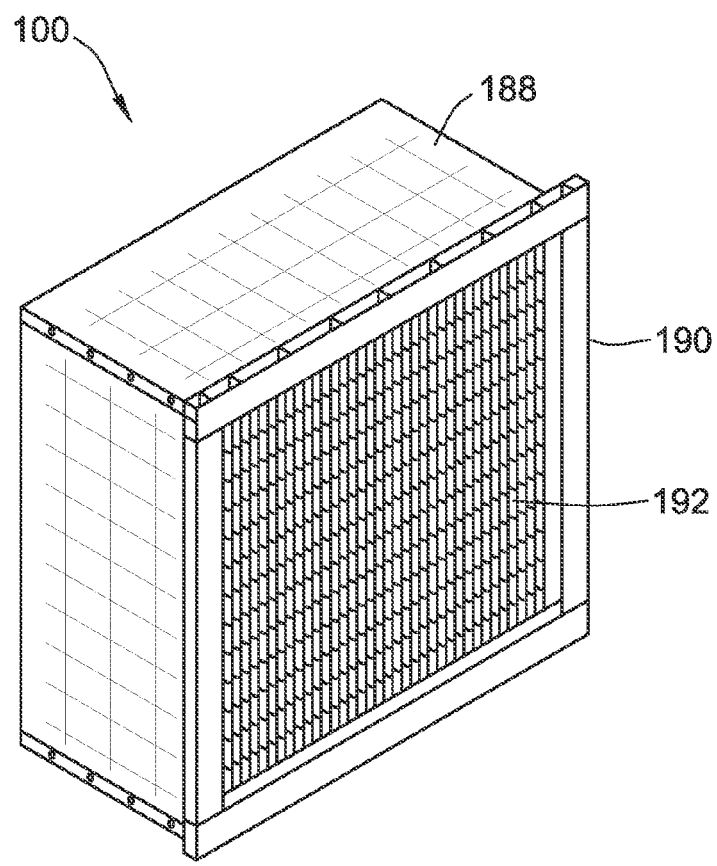
FIG. 11 is an alternative embodiment of a deep pleated primary filter that can be used as an alternative to the V-bank filter according to an embodiment.

Now that some attention has been provided to the filter housing assembly 30, additional attention will be directed toward the primary and pre-filters, which may be used in combination therewith and thereby provide for the overall filter assembly 10. Referring to FIGS. 10 and 11 are alternative embodiments of a primary filter showing the V-bank filter 32 or alternatively a single-header box filter 100 where it is in effect, a deep pleated panel filter having a depth of at least about 10 inches for most typical applications. FIG. 11 illustrates an exemplary single-header box filter 100, such as might be used in the aforementioned Micro Guard® LR filter. The box filter 100 includes cell sides 188, which in at least one embodiment, are made from a rigid material, including plastics, such as high-impact polystyrene, or metal.

In a particular embodiment, a flange 190, made of the same material as the cell sides 188, is attached on a front side of the single-header box filter 100 around the perimeter of cell sides 188. In a particular embodiment, the media is molded into pre-formed channels that form the pleats. A pleated media pack 192 is attached, using an adhesive for example, on interior surfaces of the cell sides 188. In at least one embodiment, the media pack includes embossed pleats and is made from a synthetic, water-resistant material whose performance is substantially unaffected, other than a temporary rise in airflow resistance, by humidity and exposure to moisture levels reasonably expected to be found in airstreams in animal confinement facilities.

Referring back to the V-bank filter 32 of FIG. 10, it can be seen that the V-bank filter 32 includes an outer peripheral border frame 102 providing an outer peripheral flange 104 that is rectangular and sized to be received and seated within the rectangular recess 96 (shown in FIG. 5) of the filter inlet frame 36 of filter housing assembly 30. Solid side panels may be on either side of the frame and inlet and outlet bridge sections 108 may traverse between side panels 36. In addition, a plurality of individual pleated filter elements panels 110 provided in V-shaped pairs with each element extending along an angle between adjacent inlet side and outlet side bridge sections 108. At least one pair and typically two or more pairs of pleated filter elements panels 110 arranged in V-bank configuration are provided in V-bank filter 32. Additionally, a downstream gasket 112 is preferably provided on the downstream side of the border frame 102 and more specifically the flange 104 to be compressed between the V-bank filter 32 and the seating surface 80 of the inlet frame 36 when seated and compressed thereto to thereby provide for sealing relationship between the V-bank filter 32 and the inlet frame 36. This prevents unfiltered airflow from bypassing the V-bank filter 32.

Additionally, preferably there is an upstream rectangular gasket 114 provided on the flange 104 on the side opposite the downstream gasket 112 to provide for an eventual approximate seal between the panel pre-filter 34 and the V-bank filter 32. This relationship and sealing situation can all be seen, for example, in FIGS. 13 and 14 with some additional details illustrated at least in part schematically. A top panel 153 and bottom panel 155 (also referred to as end panels) cover the top and bottom portions, respectively, of the V-bank filter 32, and the panels 153, 155 create a seal with each of the panel filters 140 such that air flowing into the V-bank filter 32 must flow through pleated filter elements panels 110. It is also contemplated that non-pleated filter panels may also be used to construct the V-bank filter element 138, such as a collection of other panel filters arranged in a V-bank configuration.

In at least one particular embodiment of the invention, the V-bank filter 32 uses a MERV 16 filter media 147 (shown in FIG. 5). In an alternate embodiment, the V-bank filter element 32 uses a MERV 15 filter media, as determined by the ASHRAE 52.2-2007 standard. In another alternate embodiment of the invention, a HEPA filter may be used as the V-bank filter media. A HEPA filter is configured to capture 99.97 of all particles of 0.3 micron in size. Additionally, a near-HEPA filter, such as that sold under the brand name Micro Guard® LR, which combines low resistance to airflow with efficiencies above 99% for 0.3 micron particles may be used in a single-header box filter 100 in place of the V-bank filter 32.

To understand why these filter medias are effective at trapping airborne viruses affecting agricultural livestock, it helps to know the particle size of some typical viruses. For example, there are several swine-specific disease agents that affect pigs and hogs in animal confinement facilities, such as mycoplasma whose particle size typically ranges from 0.3 micron to 0.9 micron. Other swine-specific disease agents include the swine influenza virus whose particle size typically ranges from 0.080 micron to 0.120 micron, the porcine reproductive and respiratory syndrome virus (PRRSV) whose particle size typically ranges from 0.050 micron to 0.065 micron, and the porcine circovirus type 2 (PCV2) whose particle size typically ranges from 0.0017 micron to 0.0022 micron. Due to the small particle size of these viruses, high-efficiency filter medias are needed to filter these particles from the air, or from the small particles that carry these viruses through the air.

Figure 12:
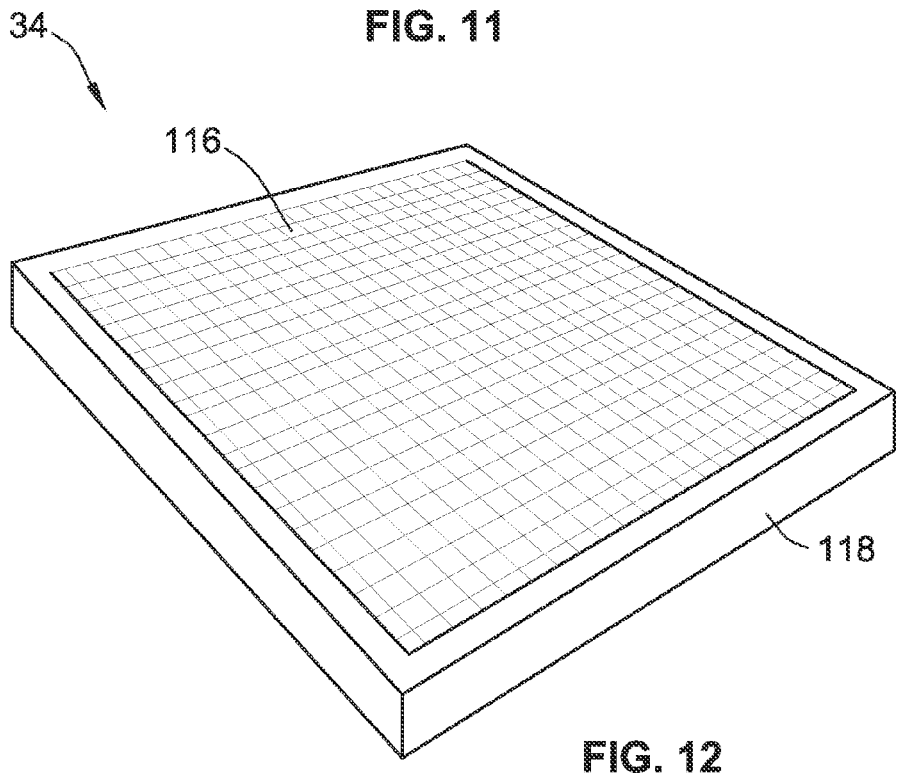
FIG. 12 is an isometric view of a panel pre-filter that can be used and installed in combination with a V-bank or other primary filter in the filter housing assembly of the prior figure.

Referring to FIG. 12, the upstream panel pre-filter may include a single-pleated card of filter media between ½ inch and 3 inches deep with the filter media indicated at 116. This filter media at 116 may be surrounded by a paper board border frame 118. Similar to the V-bank filter 32, the single-header box filter 100 would be used with a panel pre-filter 32 to remove large particulates and other contaminants that could clog or otherwise impair the performance of the single-header box filter 100. Typically, pre-filters 34 used with box filter 100 such as the Micro Guard® LR filter will have efficiencies of MERV 8 or higher.

Installation of the primary V-bank filter 32 is first with the first retainer clips 86 used to secure the V-bank filter in place and compress the at least the downstream gasket 112 against the seating surface 80 of the inlet frame 36 of filter housing assembly 30. Then, the panel pre-filter 34 may be installed and retained by the second retainer clips 88, again by rotating the retainer clips to include a retainer portion over the outer border frame 118 of the panel filter. In use, the V-bank filter 32 as well as the panel pre-filter 34 may be conveniently removed when spent and replaced with new fresh filter elements periodically after the filter life is spent.

Turning again to FIGS. 6-9, a preferred method of initial installation is described in association with a wall structure 120 of an animal confinement building. It is understood that the wall structure 120 may be a vertical wall, a horizontal wall or other such wall structure including various roof structures or rafter structures including rafter structures within such roofs. Turning to FIG. 6, the rectangular outlet frame 38 with the initial solid panel 44 is illustrated and can be fit in association with an airflow opening 122 formed in naturally or occurring in the wall structure 120 of the animal confinement building. From that, the technician may custom cut the outlet opening 54 to match and correspond to the size of airflow opening 122 in the wall structure which can be seen in FIG. 7. The technician may then securely fasten, such as bolting or screwing the outlet frame 38 to the boards 120 of wall structure 120.

Figure 8:
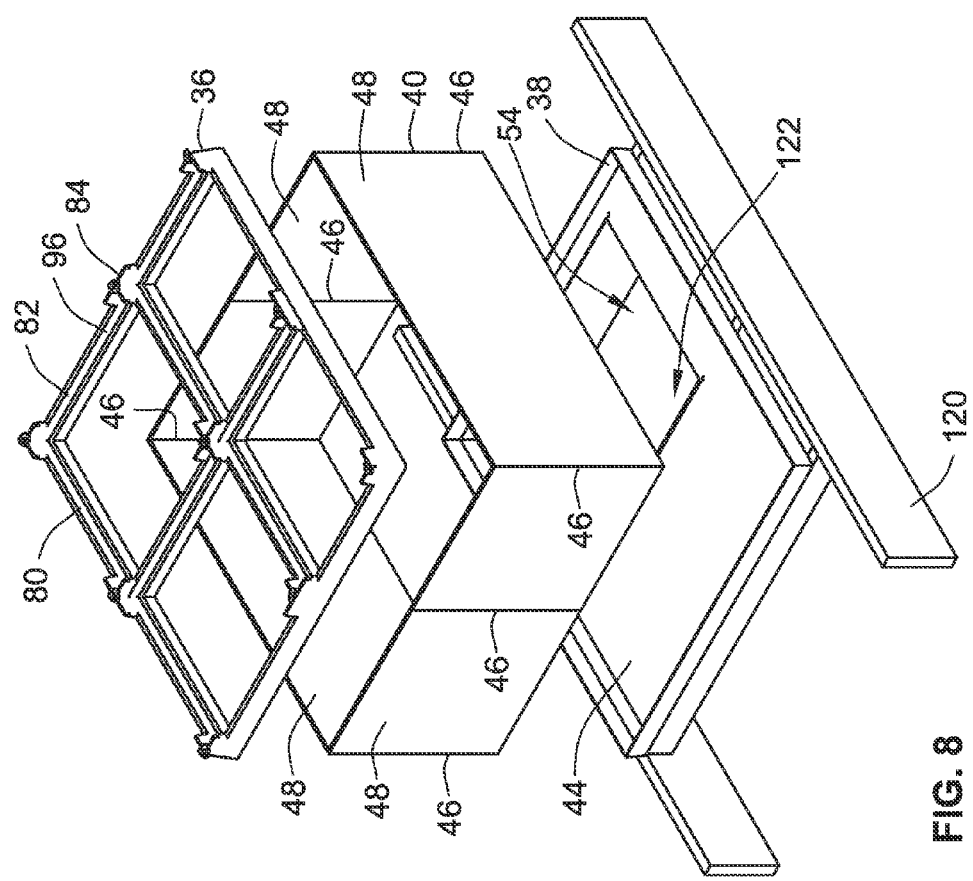
Figure 9:
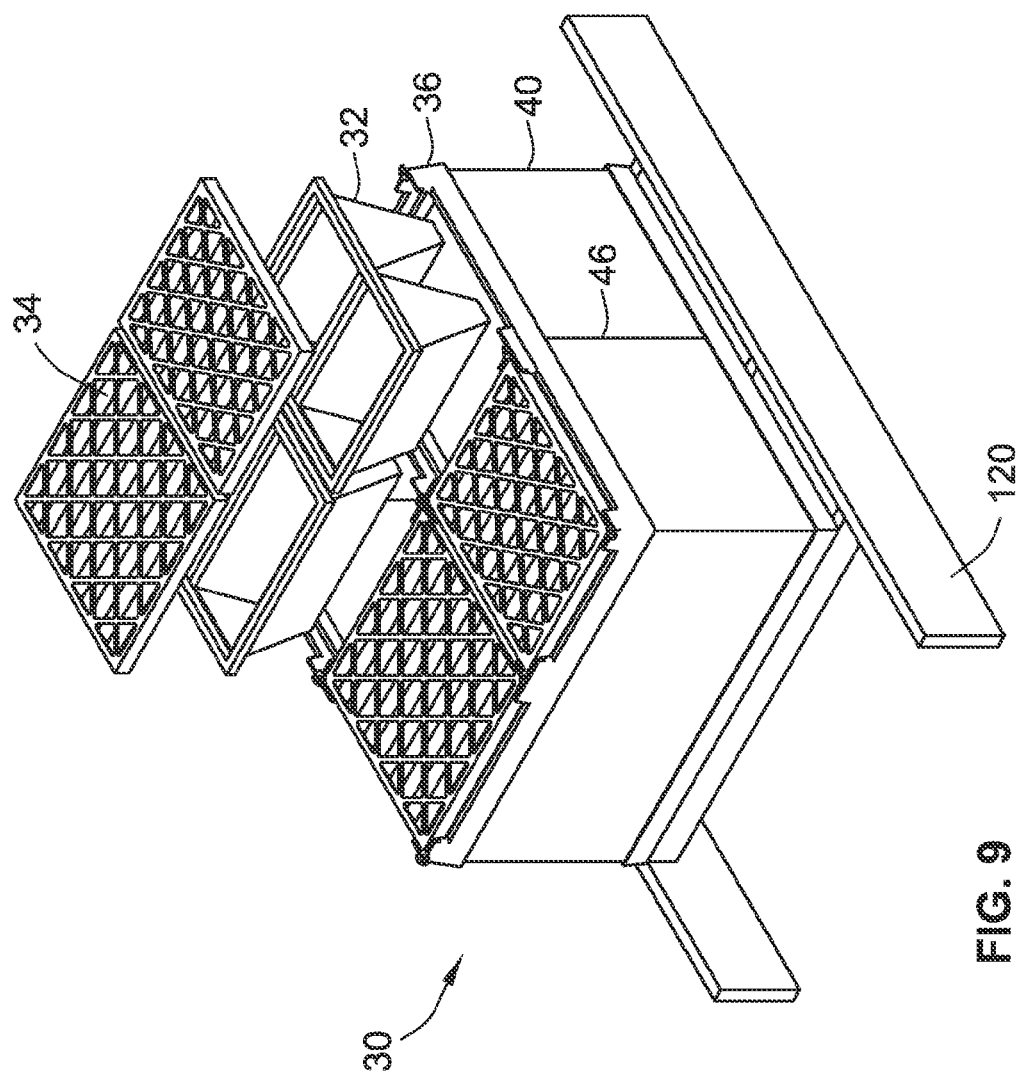

Turning then to FIG. 8 in with the appropriate upper and lower gaskets 50, 52 seated in the respective inlet and outlet frames 36 and 38, the erected tubular housing body 40 can then be snapped onto and into fitting relation with the outlet frame 38 via the snap buttons previously described. This places the lower gasket 52 into compression and sealing relationship between the housing body 40 and the outlet frame 38. The inlet frame, can similarly be situated on the other side of the housing body 40 again with the snap buttons securing the inlet frame 36 to the housing body 40 and causing compression and sealing relationship therebetween by virtue of upper gasket 50.

FIGS. 15-23 provide illustrations of two-filter and four-filter assemblies in various stages of assembly, in accordance with embodiments of the invention. However, as stated above, it is envisioned that alternate embodiments of the invention include one-filter assemblies, eight-filter assemblies, and other filter assemblies of different sizes. The assembly process should be very similar for a filter assembly, regardless of the size.

Figure 24:
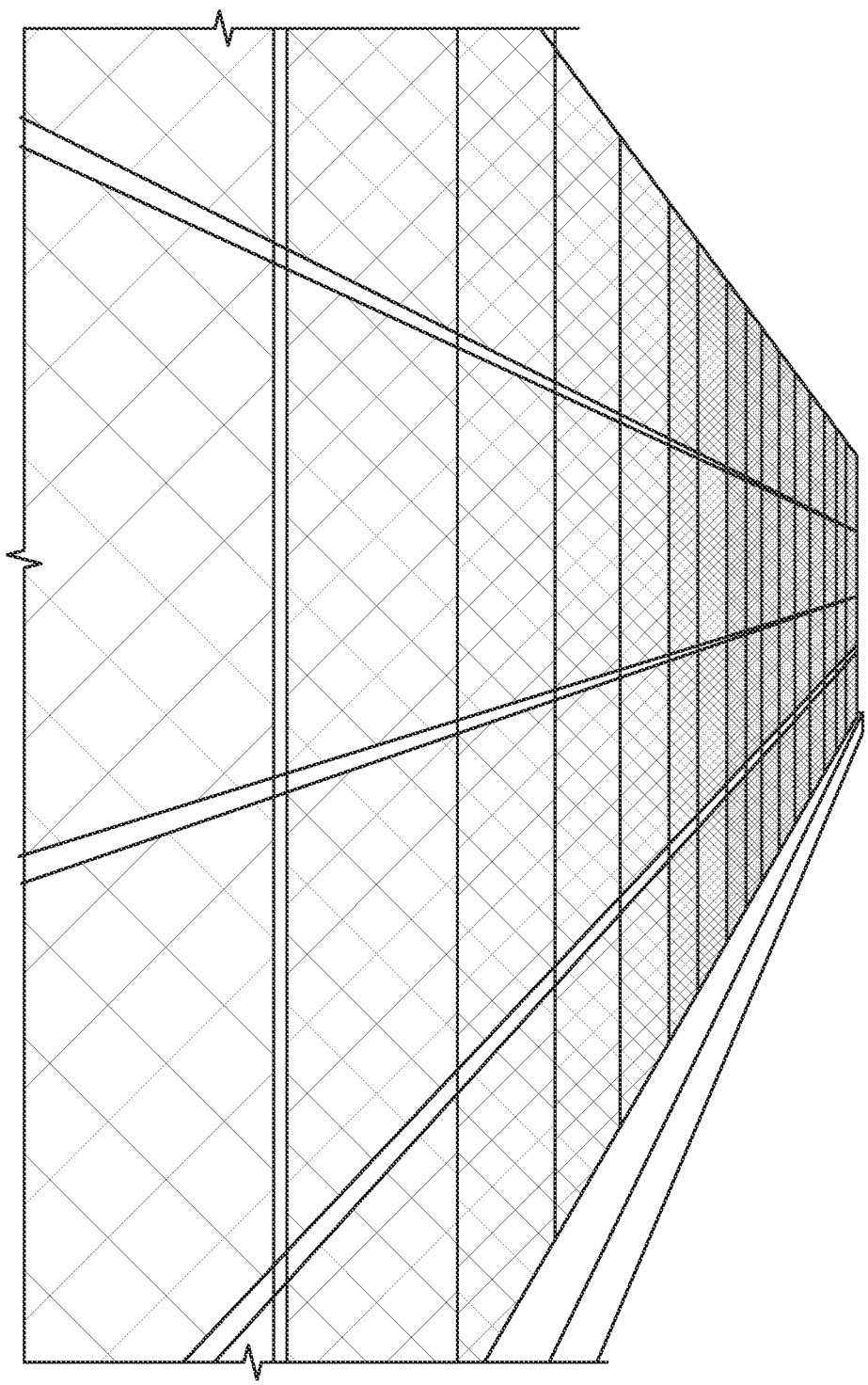
FIG. 24 is an illustration of an exemplary vertical filtering wall installed in an animal confinement facility.
Figure 32:
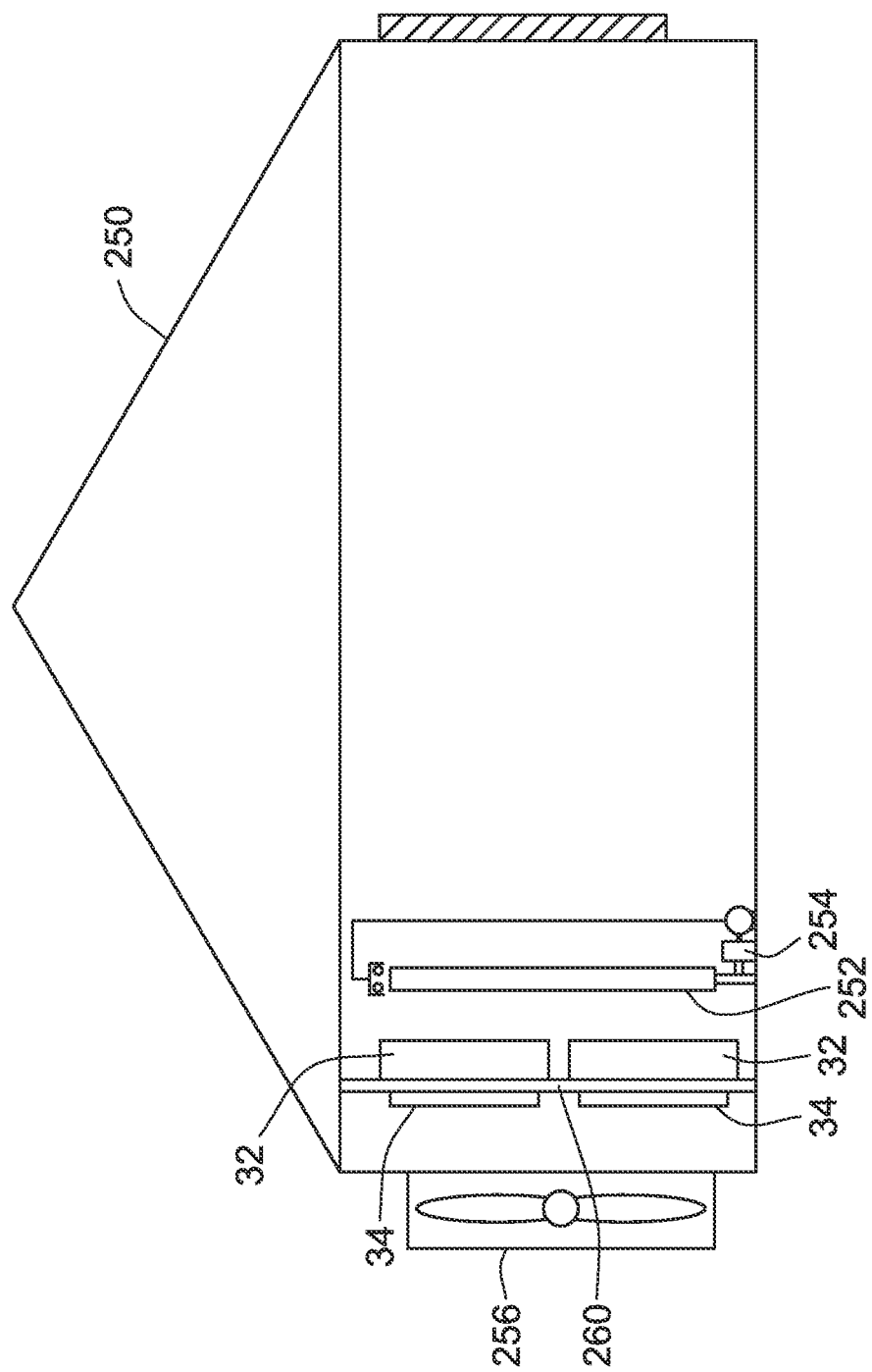
FIG. 32 is a schematic illustration of an animal confinement facility, with a filter assembly constructed in accordance with an embodiment of the invention.

FIGS. 24 and 32 illustrate another way in which filters may be employed in animal confinement buildings 250. In many animal confinement buildings 250, air is forced through banks of vertical evaporative cool pads 252 reduce the temperature inside the building 250 during the warm summer season, for example. These evaporative cool pads 252 are typically configured as a vertical wall in which water, circulated by a pump 254, continually flows from top to bottom. The evaporative cool pads 252 are generally located at one or both ends of the building 250, and large perimeter exhaust fans 256 push (or pull, depending on the location of the fan) the air through the evaporative cool pads 252 and into the building 250 such that the water flowing through the evaporative cool pads 252 decreases the air temperature.

In some cases, prior to the air flowing through the evaporative cool pads 252, it must flow through a filtering wall 260, an example of which is shown in FIGS. 24 and 32. These filtering walls 260 may include a V-bank filter 32 (shown in FIG. 10), or single-header box filter 100 (shown in FIG. 11), used in combination with a panel pre-filter 34 (shown in FIG. 12). Conventional filtering walls may include interlocking metal frames, between wall studs, which use wire clips to hold/retain the filters. The installation of these filtering walls, is often a costly and time-consuming tasks involved with the retrofitting of an existing animal confinement facility with the aforementioned cooling system.

Figure 25:
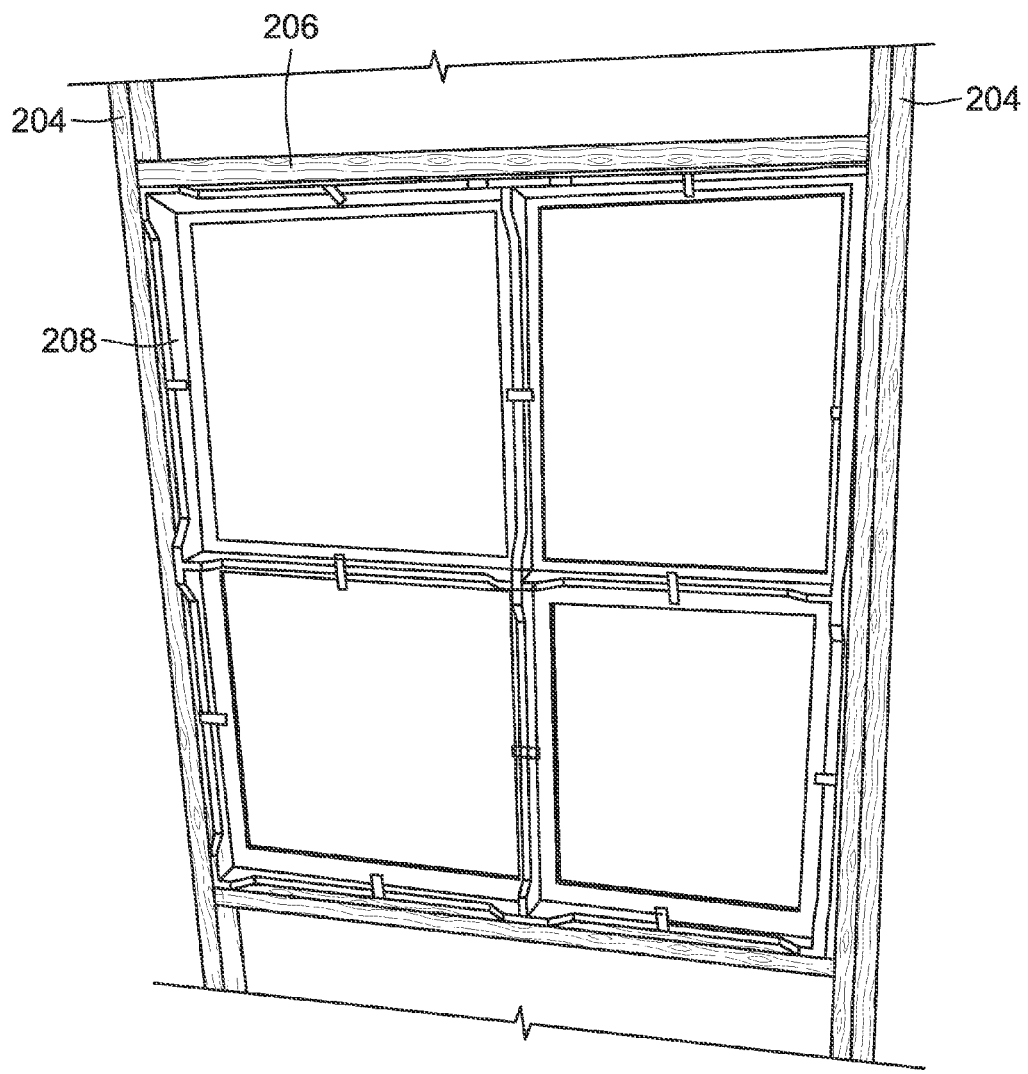
FIGS. 25-31 provide illustrations of four-filter assemblies configured for use in filtering walls and shown in various stages of assembly, in accordance with an embodiment of the invention.

FIG. 25 provides an illustration of the four-filter plastic inlet frame 36 configured for installation in an animal confinement facility within, for example, the structural wood framing of an animal confinement building 250. In the embodiment of FIG. 25 and in the following figures, the plastic inlet frame 36 is used in a filter assembly as the filter housing by itself in that it does not include the remainder of the housing components shown in the embodiments described above. As can be seen from the example of FIG. 25, instead of being assembled, the plastic inlet frame 36 is used as the housing by being inserted between simulated adjacent wall studs 204 on each side. Simulated cross-bracing 206, assembled between simulated adjacent wall studs 204, borders the plastic inlet frame 36 on the top and bottom. In the embodiments shown, the simulated wall studs 204 and cross-bracing 206 are made from wood, though it is contemplated that the framing for the animal confinement building 250 could be made from other materials, including, but not limited to, plastics and various types of metal suitable for structural members. The seal 208 between the plastic inlet frame 36 and the wooden studs 204 and cross-bracing 206 can be provided by a bead of caulk around the perimeter of the plastic inlet frame 36, or, alternatively, by an inlet frame gasket. For example, a peel-and-stick gasket may be applied to the wall studs 204 and cross-bracing 206 to provide the sealing surface. In an alternate embodiment, the inlet frame gasket 208 could be assembled to the plastic inlet frame 36 before assembly to the structural frame of the animal confinement building 250. Screws can be inserted into the plastic inlet frame 36 and screwed into the wooden studs 204 and cross-bracing 206 to secure the plastic inlet frame 36 in place.

Figure 26:
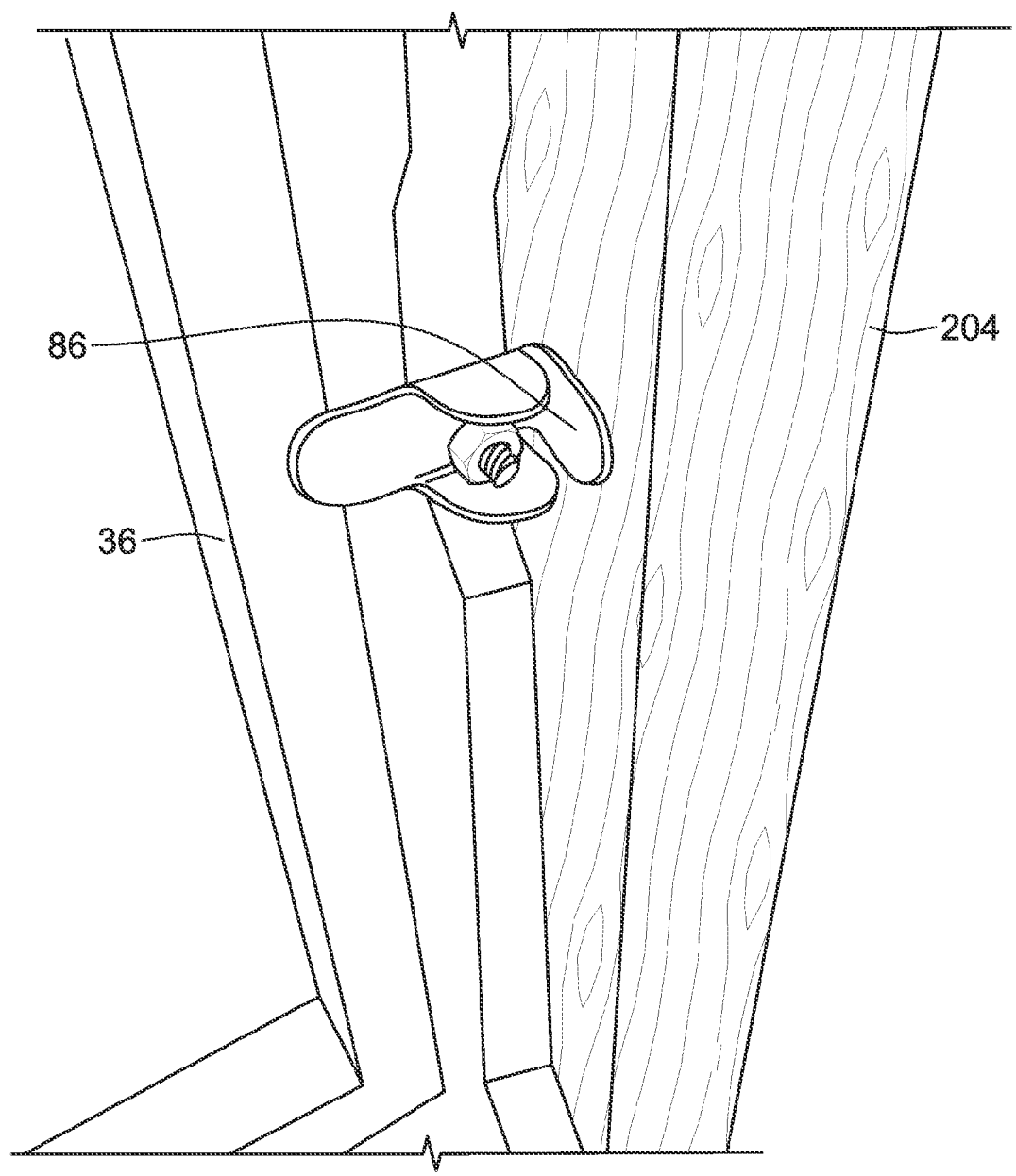
Figure 27:
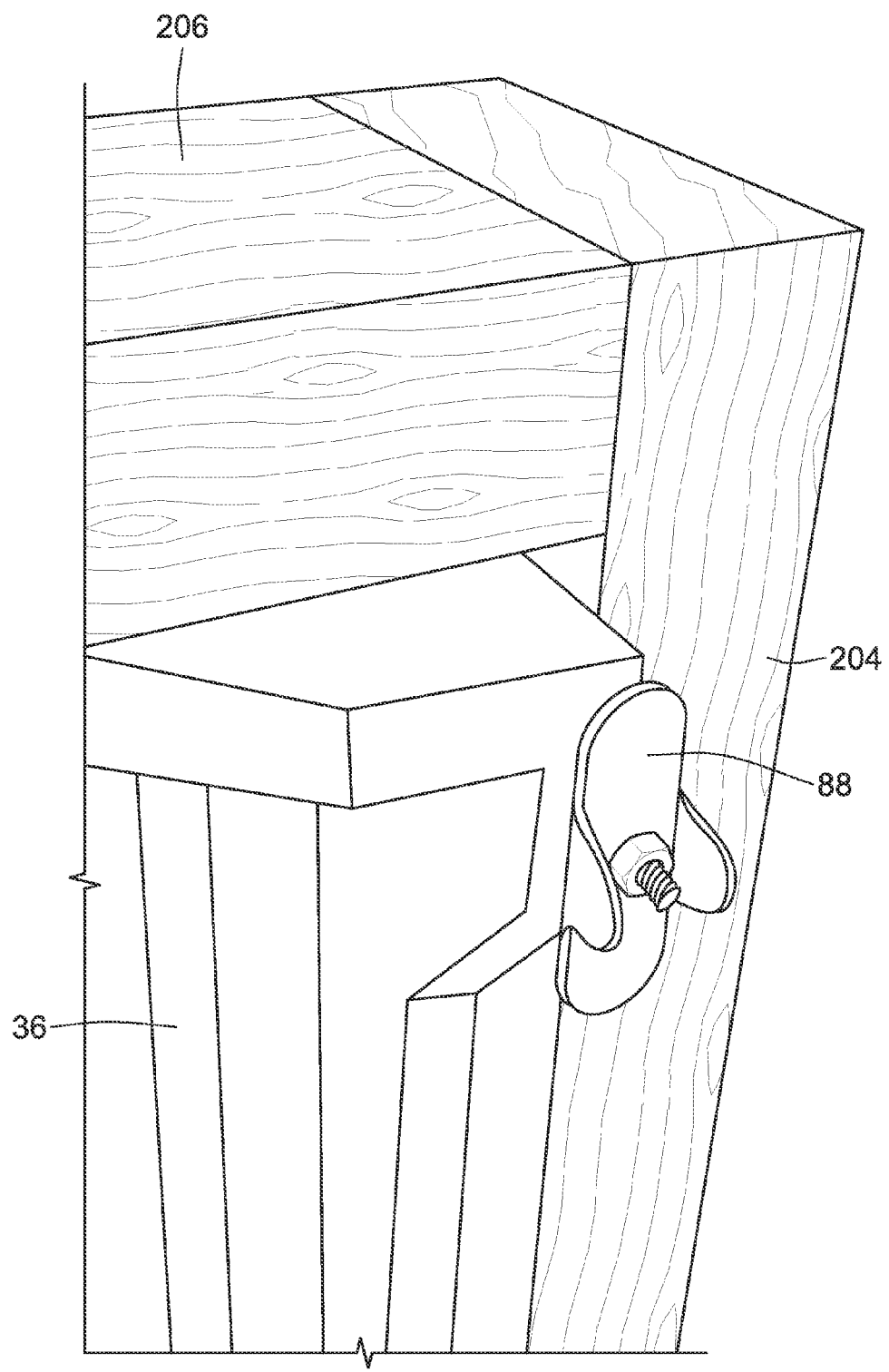
Figure 28:
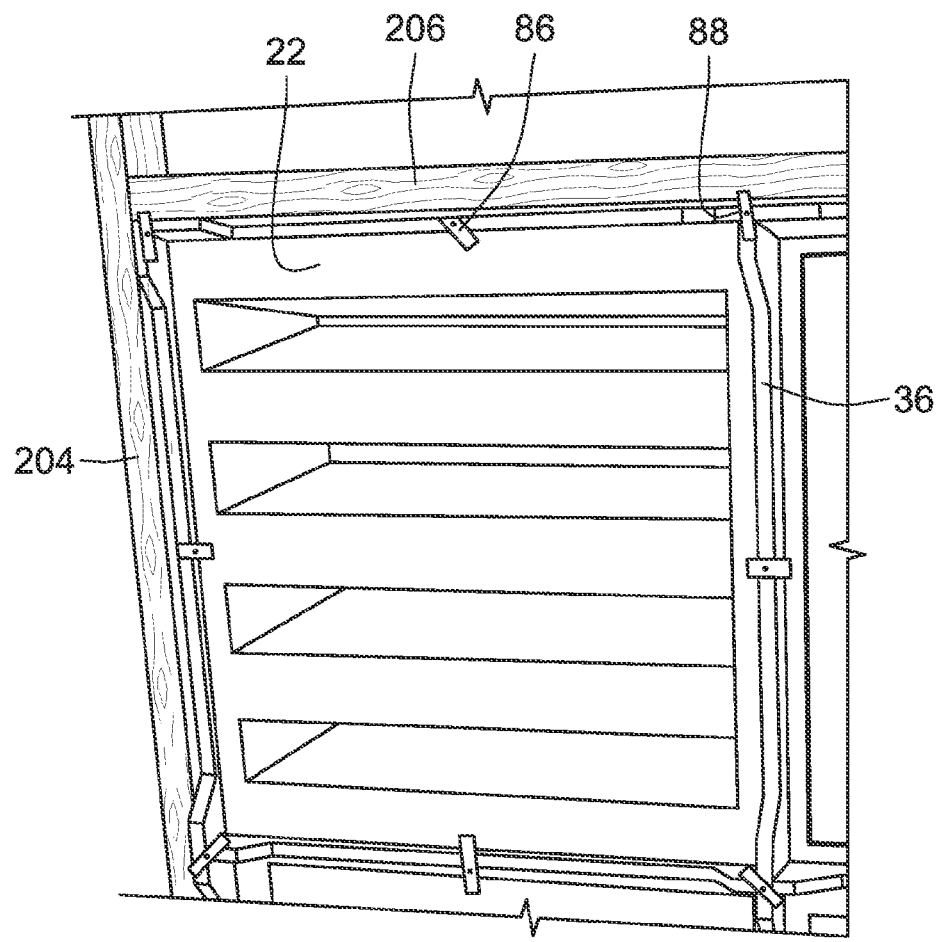
Figure 29:
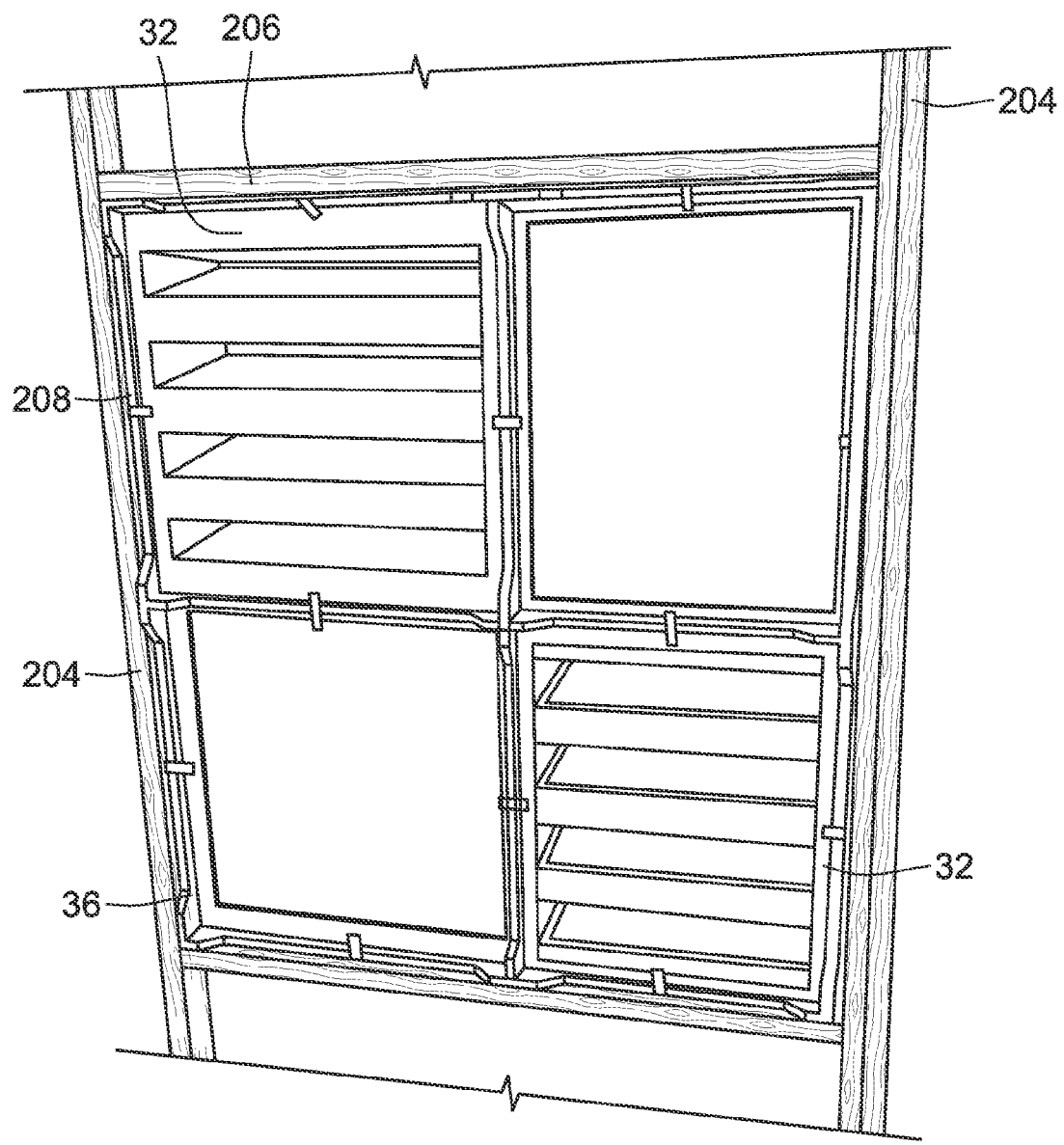
Figure 30:
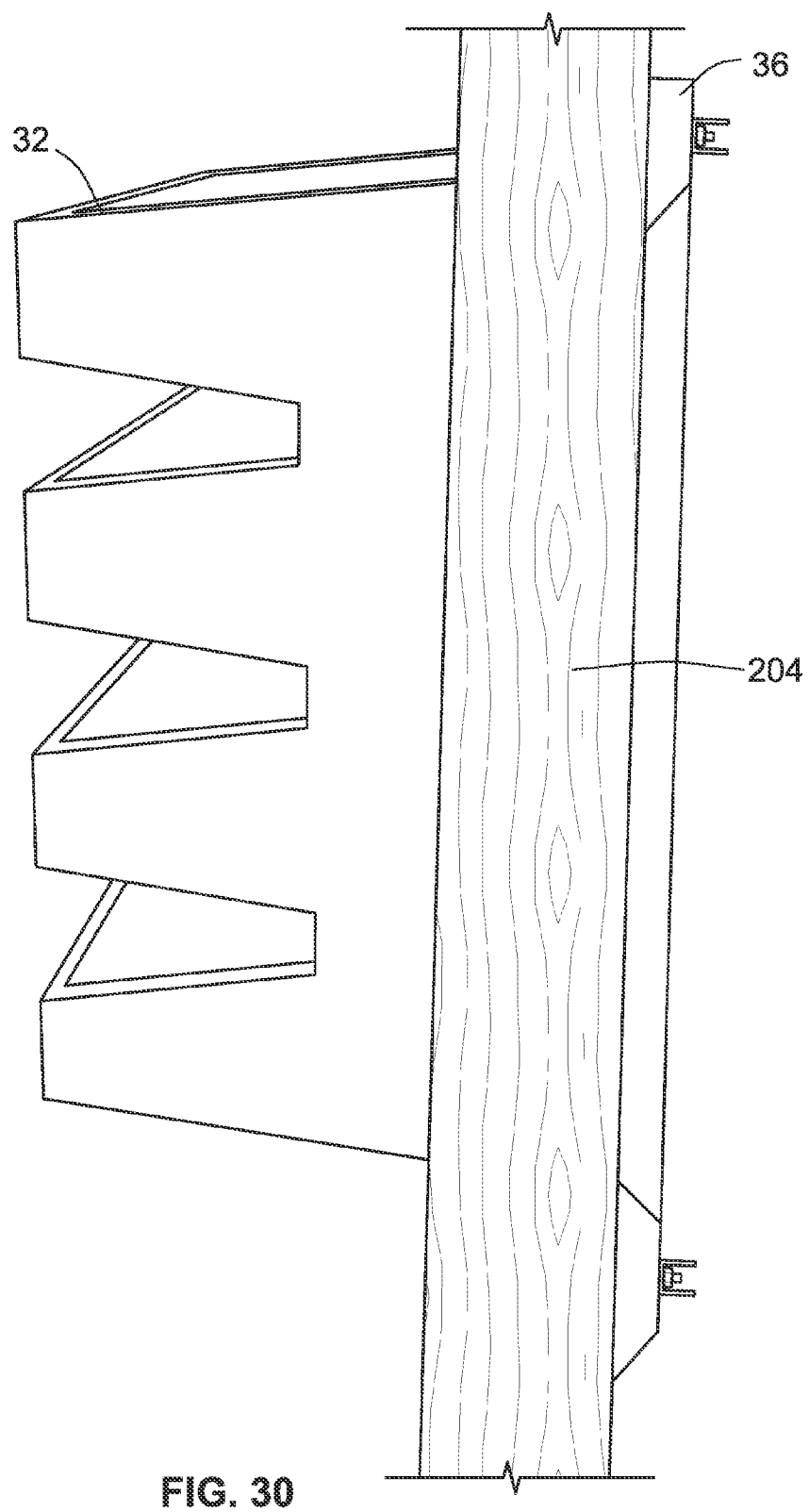

FIG. 26 provides a close-up view of the rotatable clips 86 used to retain the V-bank filter 32 (shown in FIG. 10) or single-header box filter 100 (shown in FIG. 11). FIG. 27 provides a close-up view of the rotatable clips 88 used to retain the panel pre-filter 34 (shown in FIG. 12), and keep that the panel pre-filter 34 is in sealing engagement with V-bank filter 32. FIGS. 28-30 illustrate the plastic inlet frame 36 with a one or more V-bank filters 32 installed. In a particular embodiment, the V-bank filters 32 each have the downstream gasket 112, attached to the downstream side of the V-bank flange 104, to seal the V-bank filter 32 to the plastic inlet frame 36, and the upstream gasket 114, attached to the upstream side of the V-bank flange 104, to seal the panel pre-filter 34 to the V-bank filter 32. Each V-bank filter 32 is retained by four rotatable clips 86 located approximately at the mid-point of each side of the V-bank filter flange 104. The rotatable clips 86 also maintain sealing engagement between the V-bank filter 32 and the plastic inlet frame 36. In the embodiment shown, the plastic inlet frame 36 is a four-filter assembly configured to hold two 24"×24" V-bank filters 32 or single-header box filters 100 and two 24"×20" filters. In alternate embodiments, the plastic inlet frame 36 is configured to hold four 24"×24" filters 32, 100 such that the plastic inlet frame 36 is approximately four feet by four feet.

Thus, a filtering wall 260 approximately eight feet tall would include a row of plastic inlet frames 36 configured to hold and house four 24"×24" filters 32, 100 and stacked two high. In such an arrangement, the wall studs 204 and cross-bracing 206 in the animal confinement building 250 would each be spaced approximately four feet apart to accommodate and support the row of plastic inlet frames 36. It is also envisioned that a plastic inlet frame could be configured to hold two, six, or eight 24"×24" filters 32, 100. In a particular embodiment, the eight-filter assembly would have four vertical openings and two horizontal openings. In this fashion, the plastic inlet frame 36 could still be inserted between wall studs 204 spaced four feet apart, but one plastic inlet frame would extend from floor to ceiling eliminating the need for some of the cross-bracing 206 needed with the four-filter assembly.

It can be seen that embodiments of the invention allow for relatively quick, simple installation and assembly of filtering walls 260. The plastic inlet frames 36 are configured for relatively quick and air-tight assembly to existing wood-frame construction in animal confinement buildings 250, such assembly requiring a few screws and either caulk or a sealing inlet frame gasket 208. No tools are required to install the V-bank filters 32, or alternatively single-header box filters 100, or the panel pre-filters 34.

The plastic inlet frame 36 can be made from a variety of plastic materials, including but not limited to, new or recycled ABS, high-impact polystyrene, high-density polyethylene, high molecular weight polyethylene. The plastic inlet frame 36 is corrosion resistant and is well-suited for high-moisture environments, such as animal confinement buildings 250 that employ evaporative cooling pads for cooling. In particular embodiments, the plastic material used is molded plastic (e.g., injection-molded plastic) and includes a UV-inhibitor on the exposed surfaces.

Figure 31:
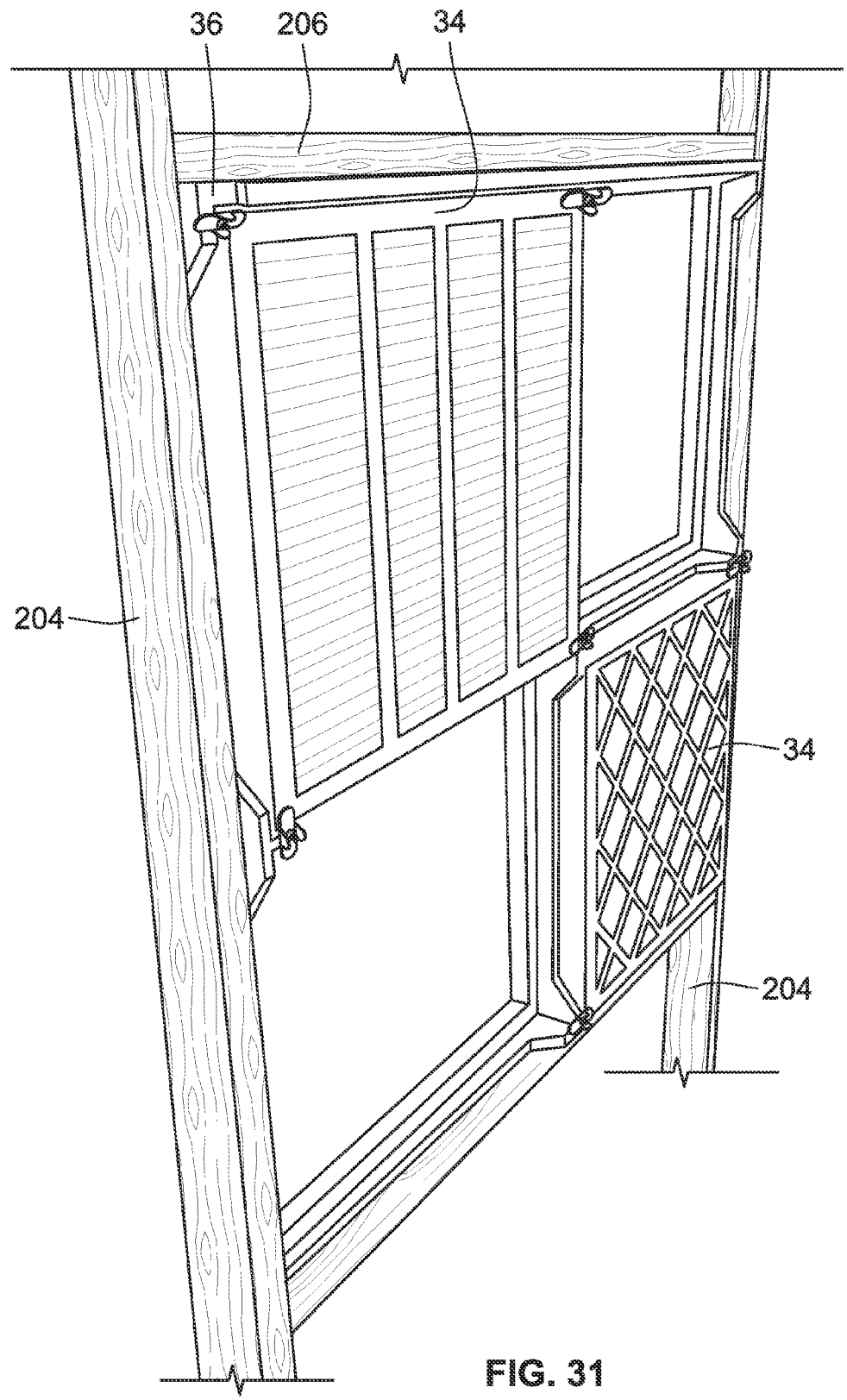

FIG. 31 illustrates the plastic inlet frame 36 with a one or more panel pre-filters 34 installed. Each panel pre-filter 34 is retained by four rotatable clips 88 located at the four corners of each opening in the plastic inlet frame 36 and therefore at each corner of the panel pre-filter 34.

Turning to FIGS. 33-38 a further embodiment is shown depicting a more compact filter element 410 for the filtration of PRRSV. According to this embodiment, the outer height and width dimensions can be the same as per a V-bank filter (e.g. the standard size in many applications is 2'×2'). However, the depth of this embodiment can be considerably less, preferably less than 10 inches, more preferably less than 8 inches, and typically about 6 inches as shown in this embodiment, or even less than 6 inches. "About" is used to encompass rounding as fractions can be rounded up or down and fall within the about range; and that it is known that actual size in filtration applications are often off a small fraction from the listed dimension.

This embodiment can be employed and used in any of the housings and systems of the prior embodiments, or those animal confinement filtration systems in aforementioned patent publications that have been referenced, even those with 12 inch deep filter envelope regions. Simply by using this filter, considerable cost savings in freight shipment alone are significant given the fact that air filters are large and occupy considerable space. It can be seen that the filter element 410 also includes a common interface frame header that is received and mounts in any of the housings previously noted.

Additionally, any of the housings and systems of the prior embodiments, or those animal confinement filtration systems in aforementioned patent publications that have been referenced can be built with a much shallower depth by decreasing dimension of the housing sidewall by about 6 inches. Housings that do not have sidewalls but a border frame a wall of a confinement building equally benefit as the envelope depth needed in the wall of the building is decreased as well. In either event, with banks of these filters being employed and occupying considerable space for air flow, significant space savings in the building can be realized.

In one embodiment, the filter element has a height H dimensional span of 2 feet or 24 inches and a width dimension span of 2 feet or 24 inches. Each of these dimensions H and W are perpendicular and transverse to the depth dimension D (which is preferably about 6 inches or less). Depth dimension D is also the path along with the air flow travels through the filter element 410.

Alternatively, deeper pleats to provide a filter element depth of 12 inches or more may be employed with the filter 100 such as shown for example in FIG. 11. With this arrangement, greater capacity for a given volume is realized, such that fewer filter elements in a bank may be necessitated, and/or greater capacity or filter lifespan can be realized.

Returning to FIG. 33, the filter element 410 includes a rectangular plastic frame 414 that includes a rectangular frame header 412 and rectangular depending sidewall 416. Upstream and downstream rectangular gaskets 418, 420 may be mounted to upstream and downstream faces of the header 412 so that the filter element seals against the corresponding housing sealing surface (for example the rectangular recess 96 shown in FIG. 13 that is formed by virtue of the seating surface 80).

Situated in the frame is a rectangular pleated filter media pack 422. The media pack may have the sides glued and sealed to the sides of the frame 414 by urethane 424 or other sealant/bonding agent that lines the inside of the frame 414 as shown in FIG. 34 in surrounding relation of the media pack 422.

Preferably, the upstream face of the media pack is recessed with the frame 414 as shown. In certain embodiments, and referencing FIG. 34*a*, an upstream face of the filter media is recessed a distance R from an upstream face of the rectangular frame or from an upstream face of a gasket along the upstream face of the rectangular frame by at least about ½ inch sufficient to provide a mixing chamber 428 sufficient to prevent blinding by an upstream prefilter 34 that may be the same pleated panel filter as that previously referenced. This is believed to prevents turbulence between the two filter elements in the "mixing chamber" 428 between the filter element 410 and the prefilter 34. Instead a more laminar flow is believed to develop to more orderly develop air flow through the assembly and medias for filtration. The distance R can also be accommodated by spacers employed in the housing such that the distance R may be accommodated by the housing with lesser recess provided in the filter element 410. In either event, the prefilter 34, is spaced from the filter media pack 422 by at least about ½ inch. As a result, the pleat pack may be between ½ and an inch less than the depth of the filter element, for example about five inches in some embodiments for a 6 inch deep filter. If the offset is provided elsewhere, a flush filter pack with the frame may be employed further reducing the size of the filter element under 6 inches.

As can also be seen in FIG. 34*a*, the filter element can be used in a housing assembly 430 that can be the same housing assembly shown in FIG. 13 (or other such housing disclosed), and can be modified to include a shortened housing sidewall such that the overall housing can be shortened by 6 inches or other appropriate shortening depending upon the depth of the filter element 410.

Another embodiment is shown in FIG. 34*b*, in which a novel eve mount configuration is provided for the compact shallower depth filter element 410. In particular, a hog confinement building 500 has a roof 102 that overhangs vertical wall 106 providing an eve 104 with limited space. In accordance with certain embodiments, a filter housing 108 comprises only the inlet frame 36 in this embodiment mounted to an underside of an eve. Compact or shortened filter elements 410 enable this location given the limited filter envelope space available. This also saves on available space and serviceability in the hog confinement building 500 as the filtration can be located in the eves.

To better facilitate for structural integrity and high air flow, some preferred embodiments may include additional pleat supports and spacers between adjacent pleat flanks 434. For filter elements configured to operate in high-flow-rate environments, spacers, such as plastic finger spacers or hot-melt adhesives spaced at regular intervals, may be placed at regular intervals along the pleated filter media to add structural rigidity and prevent deformation of the media. In addition to being pleated with heat setting of the pleats, the filter media may also be embossed to add structural rigidity, to further increase surface area, and to increase amount of media that can be manipulated into a volume for the filter element 410 and deep pleats. A method of embossed filter media is described in U.S. Pat. No. 6,685,833. U.S. Pat. No. 5,290,447, U.S. Pat. No. 5,804,014, and DE 19755466 A1 also describe methods of embossing that, in some embodiments, may be applied to the composite filter media of the present invention. Each of these patents are incorporated by reference in their entireties, as these or other pleating and embossing technologies may be used.

Figure 34:
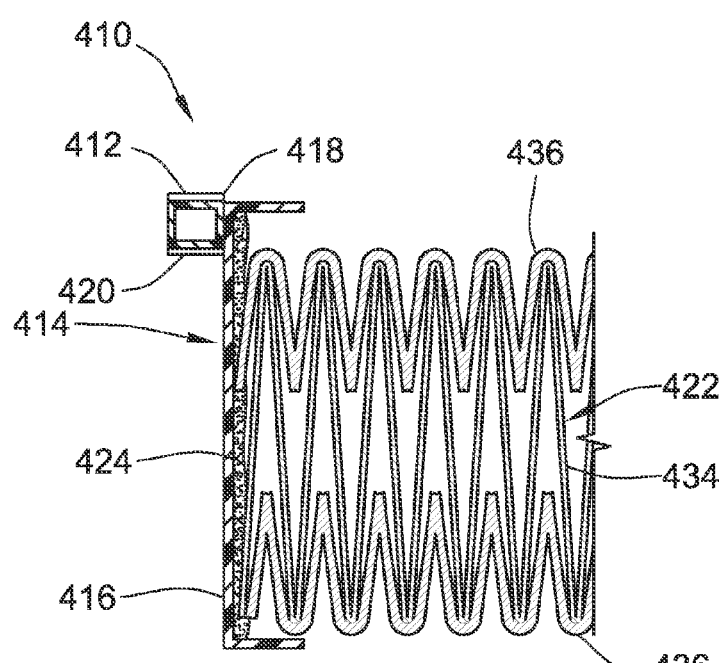
FIG. 34 is a cross section of a portion of the filter element shown in FIG. 33.
Figure 34A:
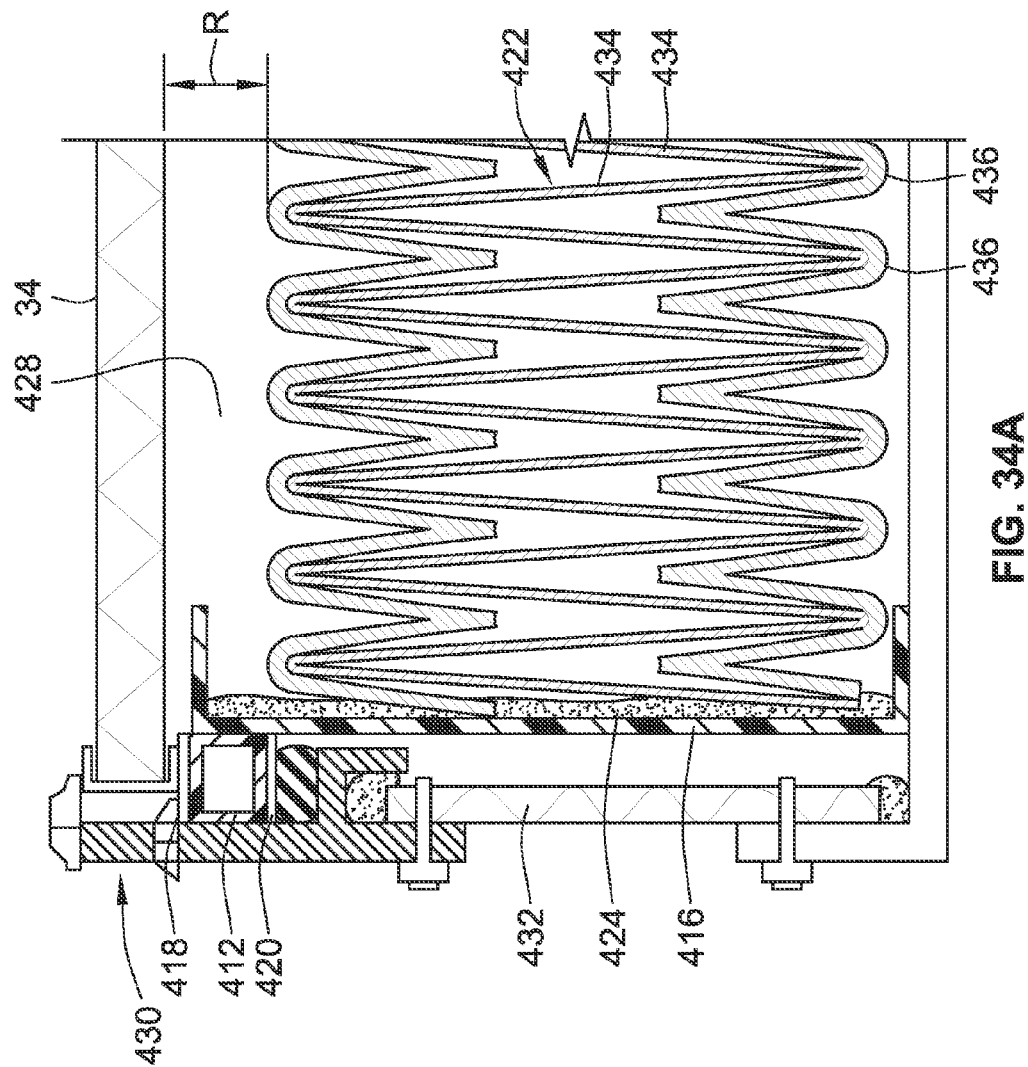
FIG. 34a is a cross sectional view of the filter element shown in FIG. 34, but also enlarged and with the filter element installed in a filter housing assembly that may be the same or similar (e.g. with shortened sidewall) as that depicted in FIG. 13.
Figure 34B:
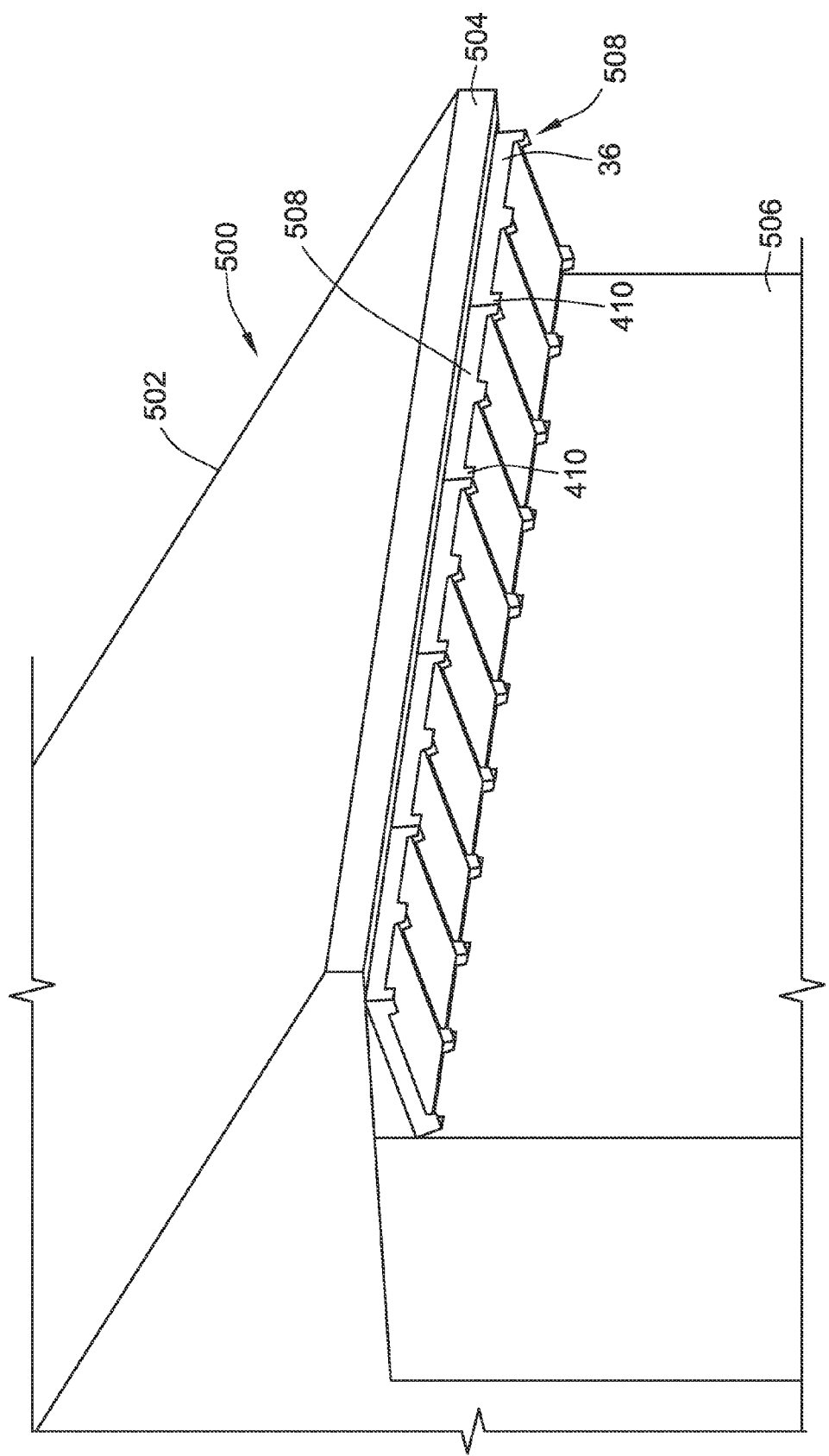
FIG. 34b is an isometric cut-away illustration of a filter housing in a tight eve space of an animal confinement building with the smaller compact filters situated therein.

For example, integrally formed embossments 438 (grooves, folds or wrinkles extending between pleat tips 435 and between inlet and outlet faces) formed into the filter media and adhesive spacer beads 436 are illustrated on the filter media of filter media pack 422 as shown in FIGS. 34 and 35. Various numbers and arrangements of embossments can be provided. The adhesive beads are on adjacent pleat tips and extend along pleat sides and attach to each other as shown. This provides consistent pleat spacing and structural integrity to the pleated filter pack. These are particularly advantageous for the deep pleats contemplated herein. Adjacent pleat tips may be spaced between ½ and 2 centimeter to compact a substantial amount of filter media into the envelope while at the same time keeping an open flow structure to accommodate high air flow capacity. Also, the peat tips may be flattened with two creased edges 440 and a flat 442 therebetween as schematically illustrated in FIG. 35. Flats 442 may between 1-3 millimeters wide in some embodiments.

Other Non-V Bank filter media packs are contemplated. For example, fluted filter media that is self supporting and has alternating fluted sheets and facing sheets with alternating flutes closed proximate opposed ends such as shown in U.S. Pat. No. 5,820,646 are contemplated as an alternative to the pleated media pack 422 and may be substituted in some embodiments. As such, U.S. Pat. No. 5,820,646 is hereby incorporated by reference in its entirety.

Filter Media Useable in any Embodiments Disclosed Herein

The filter media may have MERV rating of at least 14 and an efficiency sufficient to adequately filter the PRRSV. Most preferably at least a MERV 15 or 16 is provided. The media is relatively open to air flow and permeable with an air flow of greater than 200 cfm @ resistance of 0.2 inch water gauge, per square foot occupied by the filter element transverse to the air flow stream.

A variety of filter medias are known including cellulose and micro-glass fibers. While these may be used alone or in combination, certain preferred embodiments include synthetic fibers and preferably melt blown (and/or electrospun) provide for heat setting, high permeability and efficiency. In one embodiment one or more efficiency layers are laminated to a synthetic carrier layer. Example materials may be polypropylene and polyester, however nylon, pvc or other polymers may be selected, including fluoropolymers and fluororesins. The filter media is preferably an electret. Preferably a hydrophobic additive such as fluorine is added to the polymer by plasma fluorination such as described in Ogale, U.S. Pat. No. 6,419,871, the entire disclosure of which is hereby incorporated by reference. Other fluorination and additives that may be alternatively added are described in Rousseau et al., U.S. Pat. No. 5,908,598 and Eitzman et al., U.S. Pat. No. 6,406,657.

The fluorination of the media (addition of fluorine atoms into the polymer) create special benefit of a hydrophobic property. This is envisioned to cause special benefit as the inventors hereto have realized that PRRSV transmission typically occurs at a high relative humidity RH environments, typically exceeding RH 70. It is theorized that humidity or mist may be a carrier. As such the ability to keep out moisture that may carrier virus may be desired.

To provide for an open pore structure for flow while at the same time providing efficiency, a composite filter media 444 is preferred according to some embodiments. For example a synthetic polyester carrier layer 446 (e.g. a scrim or spun bound) may have a high efficiency polypropylene layer 448 laminated to it, preferably on the upstream side. The efficiency layer has substantially smaller fibers that may be 2-20 times (or more in the case of nanofibers) smaller than the coarser fibers of the carrier layer. The carrier layer provides for support and pleatability, while the efficiency layer establishes the particle capture efficiency of the media. A two layer composite 444 may be employed in one embodiment, although 3 or more layers may be employed. While thicker medias can be provided a thinner less obstructive media less than 1 millimeter in thickness is in some embodiments. Fewer layers are typically desired so as to prevent resistance to air flow considering the high air flow demands required in animal confinement buildings.

Figure 37:
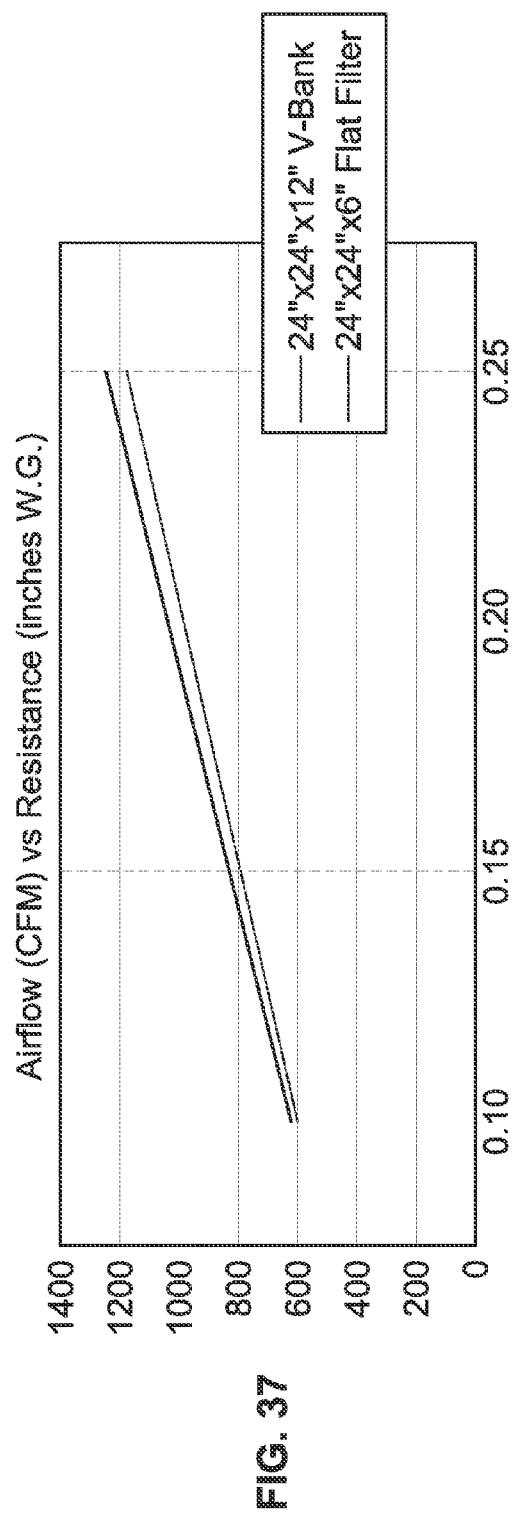
FIG. 37 is a performance graph comparison between a 6 inch deep pleated or "flat" filter and a standard 12 inch deep V-Bank filter, that illustrates the 6 inch deep pleated or "flat" filter has comparable air flow characteristics.

To provide for adequate flow capacity, an air flow of greater than 200 cfm @ resistance of 0.2 inch water gauge, per square foot occupied by the filter element transverse to the air flow stream for the filter element 410 alone. More preferably an air flow of greater than 300 cfm @ resistance of 0.2 inch water gauge (and most preferably greater than 350 cfm), per face area occupied—i.e. square foot occupied by the filter element transverse to the air flow stream for the filter element 410 alone. In an example for a standard 2' high by 2' wide filter, an air flow of greater than 800 cfm @ resistance of 0.2 inch water gauge is provided (e.g. with a prefilter added, an example has greater than 1000 cfm @ resistance of 0.2 inch water gauge as shown in FIG. 37.

For the volumetric envelope, benefit can be achieved. For example, airflow per filter envelope (airflow CFM/cubic foot of filter envelope) can be in excess of 400 and even preferably in excess of 500 @ resistance of 0.2 inch water as demonstrated in FIG. 38 when employed in combination with a prefilter. Without the prefilter (e.g. the filter element 410 alone), airflow per filter envelope (airflow CFM/cubic foot of filter envelope) can be in excess 500, more preferably in excess of 600 and most preferably in excess of 700.

With this, a variety of filter elements less than 12 inches in depth can be achieved resulting in a smaller envelope and savings on freight cost. For example, filter elements less than 10 inches, more preferably less than 8 inches and most preferably 6 inches or less can be achieved.

However if there is adequate depth or insufficient face area for filters, and greater air flow is desired deeper pleated of other self-supported filter elements (such as FIG. 11) may be employed with filter pack depths up to 11 inches of pleat depth or even more. These embodiments will provide even greater air flow as the volumetric air flow benefits illustrated in FIG. 38 demonstrate.

Turning to FIGS. 39 and 40, an alternative embodiment of a filter system assembly 610 comprising a filter housing 612, a non-v-bank pleated filter element 614 and a prefilter 616 are illustrated. The filter element of this embodiment is the same as the prior fitter element with the same pleat pack, embossing and adhesive spacers as the embodiment of FIGS. 33-34, except that the dimensions are different. In particular, this illustrates an element that is 27 inch wide by 47 inches tall; and with a depth of 6 inches (fractions being rounded). The prefilter 616 has similar height and width dimensions. Also as can be seen a different housing 612 is provided, with a surrounding sidewall and ring clips that secure the filter assembly together.

It is contemplated that for many embodiments for animal confinement facilities, the range of height and width dimensions will be between 20 and 48 inches.

STANDARDS FOR PRRSV EFFICIENCY REMOVAL

In the Swine industry, it is published and known (Dr. Dee, SDEC research—Swine Disease Eradication Center, University of Minnesota College of Veterinary Medicine) that a "Log 6 efficacy" device is the preferred filtration level to prevent all animal contraction/transmission of PRRSv and Mycoplasma hyopneumoniae (Mhyo). It is noted for example Devine et al., US 2009/0301402, refers to PRRSV testing conducted by Dr. Dee at SDEC. Basically, the filter needs to remove the airborne microorganism concentration to a level of 1/1,000,000. All lab tests and field trials have confirmed that animals in a Log 6 or less concentration of PRRSV will not contract the virus. Field trials have also been done that support a Log 4 (1/10,000) filtration device is the absolute minimum requirement to prevent "most" transmissions; however, depending on other animal health/immunity issues . . . the animals have still contracted PRRSV in a Log 4 environment.

Therefore a most preferred embodiment should pass the Log 6 concentration, and any embodiment should at least pass a Log 4 concentration. As SDEC has established the standards for PRRSV removal, testing and test standards established by the Swine Disease Eradication Center, University of Minnesota College of Veterinary Medicine are used to establish log scale results, which can be done to evaluate performance.

Generally, at least a MERV 14 and more preferably MERV 15 or 16 filter can satisfy these log scale testing standards for PRRSV.

The other advantage of using the PRRSV testing standard is that the PRRSV is a quite small virus, and thus the PRRSV testing standard is a high standard. The filter is equally effective for Mycoplasma hyopneumoniae (Mhyo). It is also therefore contemplated for other virus control applications in livestock where viruses can cause problems. For example it may be used for swine flu, foot and mouth disease for hogs or other type of livestock, or potentially for the new castle virus in poultry applications. As such, claims limitations pertaining to PRRSV sufficiency (meeting the SDEC testing standard) merely set forth a pass standard for the filter element. Many certain filter element claims are therefore broader in scope and not limited only for the application to control PRRSV and can apply to other sorts of animal confinement and application. Methods of use directed to preventing PRRSV in swine facilities are however so limited.

EXAMPLE

Figure 33:
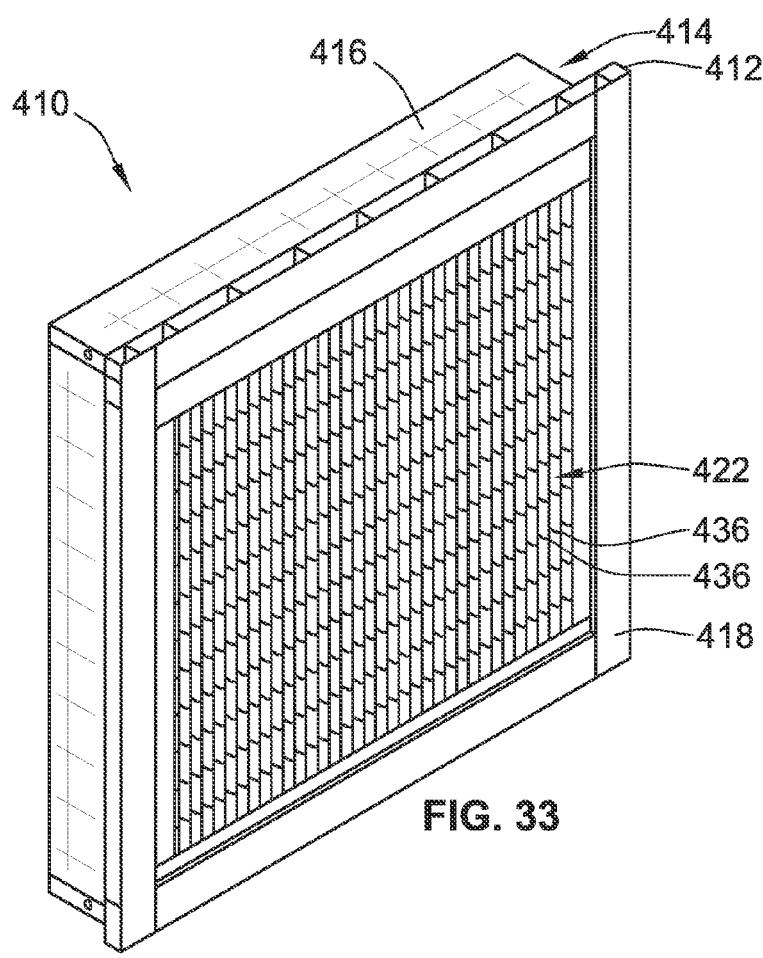
FIG. 33 is an isometric view of an embodiment of a compacted filter element in accordance with an embodiment of the present invention that can be employed in the systems and housings of any of the prior embodiments.

A 6 inch deep filter element with embossed pleats and adhesive bed separators on the pleat tips was constructed generally in accordance with the illustrated embodiment of FIG. 33. It occupied 4 square feet transverse to flow (2 foot high, by 2 foot wide).

The pleated filter media chose was a T-LAM Grade SWI16 from Transweb LLC, sold under the brand TM230PXZPN/LY50. This media is generally a meltblown (25) polypropylene that is plasma fluorinated and laminated to a polyester (50) substrate with the following reported target characteristics: basis weight 55 g/sq. m.; thickness 0.85 mm; air permeability 115 crm @ 0.5" water gauge; 1.5 mm/water gauge resistance; 4% penetration (filtration testing on a TSI-8130 with 100 cm/2 sample holder; challenge aerosol being NaCl at a face velocity of 5 cm/sec). The filter media had a MERV 16 rating.

PRRSV challenge testing conducted according to the above standards of SDEC established better than a log 6 result demonstrating efficacy of removing PRRSV sufficient to prevent disease transmission. Test results are shown in table 1 below with comparison to a HEPA filter.

TABLE 1

| PRRSV | 6" Depth-Flat Filter Treatment | Controls | |
| --- | --- | --- | --- |
| challenge | MERV 16 | No filter | HEPA |
| log 9 | 10/10 pos | 10/10 pos | 0/10 pos |
| log 7 | 0/10 pos | 10/10 pos | 0/10 pos |
| log 6 | 0/10 pos | 10/10 pos | 0/10 pos |
| log 5 | 0/10 pos | 10/10 pos | 0/10 pos |
| log 4 | 0/10 pos | 10/10 pos | 0/10 pos |
| log 3 | 0/10 pos | 10/10 pos | 0/10 pos |

Given the substantially high performance, a MERV 15 or MERV 14 is contemplated as well to perform well for the PRRSV challenge.

Additionally, an air flow and resistance comparison (air flow) comparison was made between a 12 inch deep V-Bank and a 6 inch deep filter element as described above in this example. Each had an upstream 2" deep pre-filter—a standard panel filter (Airguard DP® 40 MERV 8 pre-filter). As can be seen, quite comparable air flow characteristics with almost the same air flow capacity for a given resistance is provided as demonstrated in FIG. 37. Further, when the filter envelope or volumetric considerations are considered, the 6 inch deep filter element has substantial benefit over the V-bank as demonstrated in FIG. 38.

Figure 38:
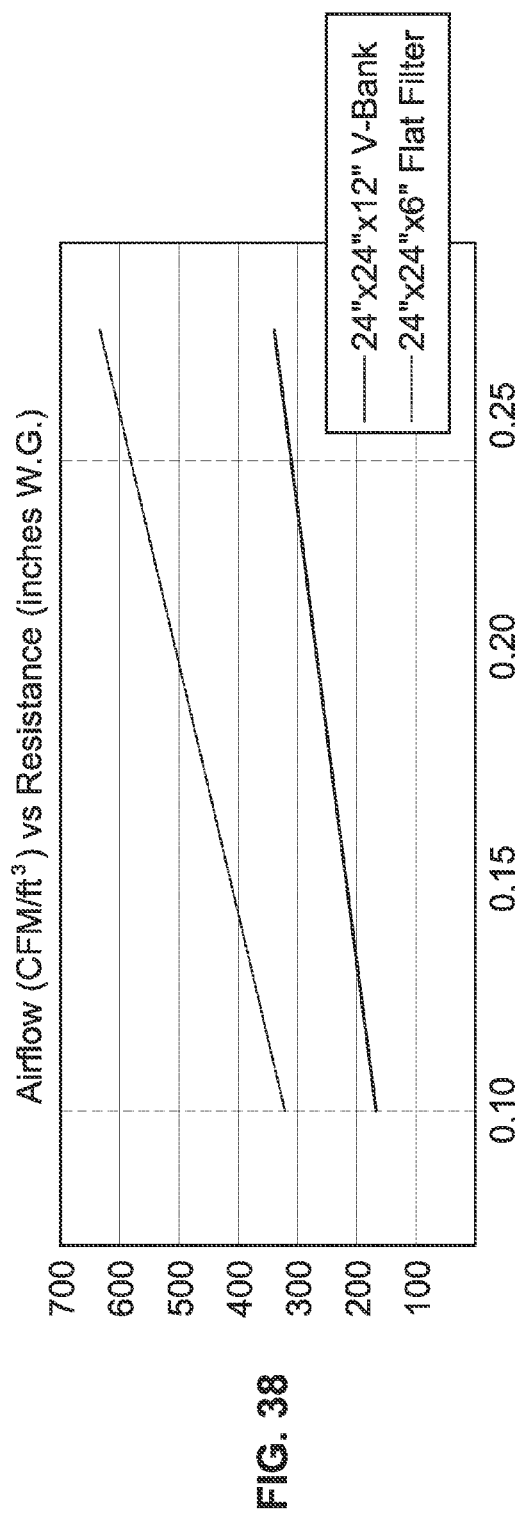
FIG. 38, is a similar performance graph as FIG. 37, but illustrates the airflow improvement relative to space occupied by the 6 inch deep pleated or "flat" filter over the V-Bank filter.

It should be noted that in FIGS. 37 and 38, the prefilter is used. The air flow characteristics of the 12 inch deep V-Bank and a 6 inch deep filter element alone are set forth in the following table. Given the filter element occupies 4 square feet, the numbers below divided by 4 square feet will provide the air flow per square foot of face area occupied by the filter element as s whole alone without prefilter (e.g. 363 cfm at 0.2" WG pressure).

TABLE 2

| |
| --- |
| 0.1"WG -959 CFM |
| 0.15"WG - 1231 CFM |
| 0.20"WG - 1453 CFM |
| 0.25" WG - 1658 CFM |

Accordingly, for the filter element alone, the corresponding volumetric advantage (for an almost 6 inch pleat depth having a filter envelope volume of 1.9 cubic feet) is as follows in the following table:

TABLE 3

| | |
|---|---|
| 0.1"WG | -505 CFM/cu. ft. |
| 0.15"WG | - 647 CFM/cu ft. |
| 0.20"WG | - 764 CFM/cu ft. |
| 0.25" WG | - 873 CFM/cu ft. |

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter assembly, comprising:
   a rectangular inlet frame having a rectangular inlet opening;
   a rectangular outlet frame;
   a housing body being collapsible to have a flattened shipping state and an erect state, the collapsible housing body in the erect state being rectangular and interposed between the rectangular inlet frame and the rectangular outlet frame in an assembled state;
   at least one filter having filter media installed in the rectangular inlet opening in generally sealing relation thereto and projecting from the inlet frame toward the outlet frame in the assembled state; and
   wherein the at least one filter includes an outer peripheral flange continuously seated against the seating surface.

2. The filter assembly of claim 1, wherein the rectangular inlet frame defines a rectangular recess having the seating surface in surrounding relation of the rectangular inlet opening, wherein the at least one filter includes a primary filter comprising: at least one of a V-bank filter and a rectangular filter that includes filter media that is at least 3 inches deep; and a prefilter upstream of the primary filter and seated against an upstream face of the outer peripheral flange.

3. The filter assembly of claim 2, comprising a first rectangular gasket interposed between the outer peripheral flange of the primary filter and the seating surface forming a seal therebetween.

4. The filter assembly of claim 3, further comprising a second rectangular gasket interposed between the upstream surface of the outer peripheral flange and the prefilter.

5. The filter assembly of claim 1, further comprising first and second housing gaskets having a rectangular shape, the first housing gasket sealing between the rectangular outlet frame and the housing body, the second housing gasket sealing between the rectangular inlet frame and the housing body.

6. The filter assembly of claim 1, wherein the rectangular outlet frame has a solid panel facing the inlet opening, the solid panel having an opening customized and matched to a corresponding air flow opening of a building.

7. The filter assembly of claim 1, wherein the rectangular outlet frame and the rectangular inlet frame are molded of material comprising plastic; and wherein the housing body comprises corrugated wall board comprising plastic material, the corrugated wall board having integral hinges formed therein to provide for folding flat and for assembly into a configuration for interposition between rectangular inlet and outlet frames, the inlet frame further including a grid-work to provide at least two of said rectangular inlet openings for separate filter elements to be installed into each rectangular inlet opening.

8. The filter assembly of claim 2, wherein the filter assembly is installed in an animal confinement building, the primary filter having a filter media rated to filter PRRSV from air flow into the building, and wherein the prefilter filters dust to prevent premature plugging of the primary filter.

9. The filter assembly of claim 1, wherein the rectangular inlet frame defines a rectangular recess having a seating surface in surrounding relation of the rectangular inlet opening, wherein the at least one filter includes a single-header box filter having an outer peripheral flange seated against the seating surface, and further includes a prefilter upstream of the single-header box filter, the prefilter seated against an upstream face of the outer peripheral flange.

10. A filter assembly, comprising:

an inlet frame having an inlet opening;

an outlet frame;

a housing body extending between the inlet frame and the outlet frame;

first and second housing gaskets, the first housing gasket sealing between the outlet frame and the housing body, the second housing gasket sealing between the inlet frame and the housing body;

at least one filter having filter media, the filter installed in the inlet opening in generally sealing relation thereto, the filter projecting from the inlet frame toward the outlet frame in the assembled state;

wherein the inlet frame and the outlet frame are rectangular, wherein the rectangular inlet frame defines a rectangular recess having a seating surface in surrounding relation to the inlet opening; and wherein the at least one filter includes an outer peripheral flange seated against the seating surface.

11. The filter assembly of claim 10, wherein the at least one filter includes a primary filter comprising at least one of a V-bank filter and a rectangular filter that includes filter media that is at least 3 inches deep, and a prefilter upstream of the primary filter and seated against an upstream face of the outer peripheral flange.

12. The filter assembly of claim 11, comprising a first rectangular gasket interposed between the outer peripheral flange of the primary filter and the seating surface forming a seal therebetween.

13. The filter assembly of claim 12, further comprising a second rectangular gasket interposed between the upstream face of the outer peripheral flange and the prefilter.

14. The filter assembly of claim 11, wherein the filter assembly is installed in an animal confinement building, the primary filter having a filter media rated to filter PRRSV from air flow into the building and wherein the prefilter filters dust to prevent premature plugging of the primary filter.

15. A method of assembling an air filter housing, comprising:
    providing a rectangular inlet frame, a rectangular outlet outlet frame, and a collapsed housing body having a generally flattened state; wherein the rectangular inlet frame defines a rectangular recess having a seating surface in surrounding relation to the inlet opening to which a primary filter with an outer peripheral flange maybe seated;
    erecting the housing body to a tubular shape adapted to mate with the inlet and outlet frames;
    fastening the housing body to each of the inlet frame and the outlet frame; and
    mounting the air filter housing to a building.

16. The method of claim 15, further comprising installing the air filter housing in an animal confinement building in a location to filter external air entering the animal confinement building; and housing the primary filter having a filter media rated to filter PRRSV from air flow into the building, and housing a prefilter upstream of the primary filter, wherein the prefilter filters dust to prevent premature plugging of the primary filter.

17. The method of claim 16, further comprising providing a panel across the outlet frame, cutting the panel to match an opening provided in the animal confinement building, and securing the air filter housing over the opening in the animal confinement building while sealing therebetween.

18. The method of claim 15 further comprising, sealing between the housing body and each of the inlet and outlet frames.

19. A method of installing a filter assembly into an animal confinement building, comprising:
    installing a bottom housing panel over an air flow opening in the animal confinement building;
    cutting the bottom housing panel to have an outlet opening matching the air flow opening;
    assembling an upper portion of the filter housing to the bottom housing panel, the upper portion including at least one inlet opening; and
    installing at least one filter element into the inlet opening.

20. The method of claim 19, further comprising:
    providing an inlet frame and a housing body to construct the upper portion;
    erecting the housing body with a tubular shape between the inlet frame and the bottom housing panel; and
    fastening the housing body to each of the inlet frame and the outlet frame.

21. The method of claim 20 further comprising, sealing between the housing body and each of the inlet and outlet frames.

22. The method of claim 20, further comprising: arranging the filter assembly in the animal confinement building in a location to filter external air entering the animal confinement building; and housing the at least one filter element having a filter media rated to filter PRRSV from air flow into the building, and housing a prefilter upstream of the at least one filter element, wherein the prefilter filters dust to prevent premature plugging of the at least one filter element.

23. The filter assembly of claim 1, wherein the at least one filter is rectangular and the outer peripheral flange is continuous around the rectangular periphery.

24. The filter assembly of claim 1, wherein the inlet frame, the outlet frame, and the housing body are secured together in the erect state forming a filter housing, and wherein the at least one filter further comprises a border frame surrounding and supporting the filter media.

25. The filter assembly of claim 10, wherein the inlet frame, the outlet frame, and the housing body are secured together forming a filter housing, and wherein the at least one filter further comprises a border frame surrounding and supporting the filter media.

26. The method of claim 15, further comprising removably installing a filter into the air filter housing, the filter comprising a filter media and a border frame surrounding and supporting the filter media.

* * * * *